(12) United States Patent
Horner et al.

(10) Patent No.: US 10,781,999 B2
(45) Date of Patent: *Sep. 22, 2020

(54) LUMINOUS SYSTEMS

(71) Applicant: Bambu Vault LLC, Lowell, MA (US)

(72) Inventors: M. Glenn Horner, West Roxbury, MA (US); Edward D. Kingsley, Stow, MA (US); Satish Agrawal, Concord, MA (US); Louis Cincotta, Andover, MA (US)

(73) Assignee: BAMBU VAULT LLC, Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,019

(22) Filed: Sep. 12, 2018

(65) Prior Publication Data

US 2019/0011111 A1    Jan. 10, 2019

Related U.S. Application Data

(63) Continuation of application No. 15/726,581, filed on Oct. 6, 2017, now Pat. No. 10,101,003, which is a
(Continued)

(51) Int. Cl.
*F21V 7/00* (2006.01)
*G02F 2/02* (2006.01)
(Continued)

(52) U.S. Cl.
CPC .............. *F21V 7/00* (2013.01); *F21K 9/90* (2013.01); *G02F 2/004* (2013.01); *G02F 2/02* (2013.01);
(Continued)

(58) Field of Classification Search
CPC .. F21V 9/16; F21V 7/22; C09K 11/02; G02B 6/0041; G02B 6/005
(Continued)

(56) References Cited

U.S. PATENT DOCUMENTS 4,542,449 A    9/1985 Whitehead
4,791,540 A    12/1988 Dreyer, Jr. et al.
(Continued)

FOREIGN PATENT DOCUMENTS

CN    101185109 A    5/2008
CN    101517761 A    8/2009
(Continued)

OTHER PUBLICATIONS

Extended European Search Report dated Mar. 13, 2017 in connection with corresponding European Patent Application No. 14835401.2.
(Continued)

*Primary Examiner* — Blake C Riddick
(74) *Attorney, Agent, or Firm* — Morgan, Lewis & Bockius LLP

(57) ABSTRACT

A luminous system comprising one or more illumination sources, a multilayer structure, and one or more diffuse reflection layers being optically decoupled from the multilayer structure, wherein the emission and the reflection of the luminous system produce a first observed visible color when the one or more illumination sources are powered and a second observed visible color when the one or more illumination sources are non-powered is disclosed. Also disclosed are methods of creating the inventive luminous system.

28 Claims, 9 Drawing Sheets

Related U.S. Application Data continuation of application No. 13/963,032, filed on Aug. 9, 2013, now Pat. No. 9,797,573.

(51) Int. Cl.
*F21K 9/90* (2016.01)
*G02F 2/00* (2006.01)
*F21V 8/00* (2006.01)

(52) U.S. Cl.
CPC ....... *G02B 6/0055* (2013.01); *Y10T 29/49002* (2015.01)

(58) Field of Classification Search
USPC .......... 250/474.1, 459.1, 462.1; 362/84, 606
See application file for complete search history.

(56) References Cited

U.S. PATENT DOCUMENTS

| | | | |
|---|---|---|---|
| 4,799,131 A | 1/1989 | Aho et al. | |
| 4,883,341 A | 11/1989 | Whitehead | |
| 4,984,144 A | 1/1991 | Cobb, Jr. et al. | |
| 6,600,175 B1 | 7/2003 | Baretz et al. | |
| 7,070,300 B2 | 7/2006 | Harbers et al. | |
| 7,151,283 B2 | 12/2006 | Reeh et al. | |
| 7,639,916 B2 | 12/2009 | Fine | |
| 8,128,272 B2 | 3/2012 | Fine et al. | |
| 8,178,852 B2 | 5/2012 | Kingsley et al. | |
| 8,232,533 B2 | 7/2012 | Kingsley et al. | |
| 8,243,230 B2 | 8/2012 | Oversluizen et al. | |
| 8,415,642 B2 | 4/2013 | Kingsley et al. | |
| 9,797,573 B2 * | 10/2017 | Horner | G02F 2/02 |
| 10,101,003 B2 * | 10/2018 | Horner | G02F 2/02 |
| 2006/0255716 A1 | 11/2006 | Tsutsumi et al. | |
| 2007/0047219 A1 | 3/2007 | Thompson et al. | |
| 2008/0205035 A1 | 8/2008 | Asvadi | |
| 2008/0231170 A1 | 9/2008 | Masato et al. | |
| 2009/0257242 A1 | 10/2009 | Wendman | |
| 2009/0268273 A1 | 10/2009 | Powers et al. | |
| 2010/0012959 A1 | 1/2010 | Wilm et al. | |
| 2010/0014319 A1 | 1/2010 | Oversluizen et al. | |
| 2010/0172122 A1 | 7/2010 | Ramer | |
| 2010/0303409 A1 | 12/2010 | Ku et al. | |
| 2011/0175527 A1 | 7/2011 | Ramer | |
| 2011/0175546 A1 | 7/2011 | Ramer | |
| 2011/0176291 A1 | 7/2011 | Sanders | |
| 2011/0248287 A1 | 10/2011 | Yuan et al. | |
| 2011/0267801 A1 | 11/2011 | Tong et al. | |
| 2012/0080613 A1 | 4/2012 | Kingsley et al. | |
| 2012/0087103 A1 | 4/2012 | Dai | |
| 2012/0140126 A1 | 6/2012 | Werth | |
| 2012/0155113 A1 | 6/2012 | Fine et al. | |
| 2013/0026504 A1 | 1/2013 | Marx et al. | |
| 2013/0050979 A1 | 2/2013 | Van de Ven | |
| 2013/0088853 A1 | 4/2013 | Kingsley et al. | |
| 2013/0175456 A1 | 7/2013 | Kingsley et al. | |
| 2013/0215597 A1 | 8/2013 | Davis | |
| 2014/0041572 A1 | 2/2014 | Schuler et al. | |
| 2015/0041683 A1 | 2/2015 | Horner et al. | |
| 2018/0031205 A1 | 2/2018 | Horner et al. | |

FOREIGN PATENT DOCUMENTS

| | | |
|---|---|---|
| CN | 101622865 A | 1/2010 |
| KR | 20080063986 A | 7/2008 |
| KR | 20100029878 A | 3/2010 |
| WO | 2012/120332 A1 | 9/2012 |
| WO | 2013/023008 A1 | 2/2013 |
| WO | 2013/035002 A2 | 3/2013 |

OTHER PUBLICATIONS

Official action dated Nov. 1, 2016 in connection with corresponding Chinese Patent Application No. 201480047590.1.
International Search Report for International Application No. PCT/US2014/048576, International Application Filing Date: Jul. 29, 2014, dated Nov. 13, 2014, 5 pages.
Written Opinion of the International Searching Authority for International Application No. PCT/US2014/048576, International Application Filing Date: Jul. 29, 2014, dated Nov. 13, 2014, 6 pages.
Nobuaki Tanaka, et al., "Photodegradation of Polymer-Dispersed Perylene Di-imide Dyes", Applied Optics, 2006, 3846-51, vol. 45.
Office action dated Aug. 31, 2017 in connection with corresponding Chinese Patent Application No. 201480047590.1 (with translation).
Office Action for Chinese Patent Application No. 201810824175.2 dated Dec. 23, 2019, 15 pages.

\* cited by examiner

LUMINOUS SYSTEMS

CROSS-REFERENCE TO RELATED APPLICATIONS

This application is a continuation of U.S. patent application Ser. No. 15/726,581, filed Oct. 6, 2017, which is a continuation of U.S. patent application Ser. No. 13/963,032, filed Aug. 9, 2013, now issued as U.S. Pat. No. 9,797,573, each of which is incorporated herein by reference in its entirety.

BACKGROUND OF THE INVENTION

These teachings relate generally to luminous systems that provide observed visible color, and more particularly to a luminous system that provides a first observed visible color that is primarily produced by the emission of the system when such system is powered, and also provides a second observed visible color that is primarily produced by the reflection of the system when such system is non-powered.

The primary purpose of luminous systems is to generate light of certain desired visible color(s), white, blue, green, etc., with the use of illumination source(s), e.g. LEDs, for a broad range of applications, e.g. general lighting, illuminated graphics, etc. Thus, when the illumination source(s) are powered, the observed visible color of such systems is predominantly a result of the emission produced by the system. However, when the illumination sources are non-powered, the observed visible color of such systems is mainly produced by way of ambient light reflected from the surface of the system, e.g. a luminous system having a white surface will reflect ambient light that is observed as a white visible color, whereas a luminous system having a red surface will reflect ambient light that is observed as a red visible color.

In general, white illumination sources, including white light LEDs, have been used in luminous systems to generate light of observed visible color, e.g. white light or colored light. In instances where colored light is desired, these systems generate color through the absorption of all the wavelengths of light produced from the white illumination source(s), except those wavelengths associated with the color desired. Unfortunately, this approach to color generation results in substantial loss of energy due firstly, to the amount of energy needed to create the white light, and secondly, to the additional energy lost in the subtraction of the wavelengths to create a colored emission. This can be a particular problem when the white illumination source does not contain sufficient energy of the desired color, such as for example in the case of white light LEDs that provide only modest amounts of energy at red wavelengths. An additional drawback to utilizing white illumination sources is the difficulty in manipulation of the reflected light of the system, therefore suffering from the limitation that the observed visible color produced when the white illumination sources are non-powered must be substantially the same as the observed color when the illumination sources are powered. This is due to the color generation mechanism of the system since wavelengths associated with that of the white illumination source are similar to those associated with the ambient light, therefore making it difficult to tailor the emission of the system without affecting the reflection of the system and vice versa.

In an effort to provide more efficient luminous systems, UV or blue illumination sources have been utilized, rather than white, to generate light of visible color, e.g. white light or colored light. This is generally accomplished by down-converting the emission energy of the UV or blue illumination source(s) into longer wavelengths with the use of energy converting material(s), e.g. phosphorescent and/or fluorescent materials. For example, when a blue LED is used as the illumination source to provide the primary electromagnetic radiation, the luminous system can generate white light by absorbing a portion of the primary electromagnetic radiation, i.e. blue light in this case, using a energy conversion layer and down-converting this radiation to a secondary electromagnetic radiation having green and yellow wavelengths, thereby resulting in an emission of the system comprising blue, green and yellow wavelengths which produce an observed visible color of white. Although these systems may be more efficient in generating light than those which utilize white light sources, when these systems are non-powered, the observed visible color of the system is also difficult to tailor to a desired observed visible color. However, with the use of UV or blue illumination source(s) along with energy converting material(s), the observed visible color of the system when the UV or blue illumination source(s) are non-powered is now not only the unabsorbed ambient light that is reflected from the surface of the system, but also the emission of the energy conversion material(s), although minimal, due to the system's exposure to ambient light. For example, the absorption of blue light by the energy conversion layer causes the reflectance of the surface of the system to appear yellowish when the primary electromagnetic radiation is not supplied, i.e. the illumination source(s) are non-powered, resulting in an undesirable observed visible color.

There is, therefore, a need for utilizing higher efficiency luminous systems which are capable of not only providing a desired observed visible color when powered, but also a desired observed visible color when non-powered. It is also desirable to provide higher efficiency luminous systems, wherein the system not only embodies elements for achieving desired observed visible color when powered and when non-powered, but also embodies elements that enable the system to provide a wider gamut of observed visible color without substantial loss of energy. Furthermore, it is also desirable to incorporate within these systems elements that enable the luminous system to not only generate light of observed visible color, but also for a broad surface area.

BRIEF SUMMARY OF THE INVENTION

The present teachings provide for a luminous system comprising one or more illumination sources that output, when powered, a primary electromagnetic radiation through one or more exit regions, a multilayer structure, and one or more diffuse reflection layers that are optically decoupled from the multilayer structure and redirect at least a portion of ambient electromagnetic radiation to the viewing hemisphere. The emission and the reflection of the luminous system produce a first observed visible color when the one or more illumination sources are powered and a second observed visible color when the one or more illumination sources are non-powered. In some instances the first observed visible color and the second observed visible color may be substantially similar. The one or more illumination sources of the present teachings comprise one or more light emitting elements. The one or more illumination sources may further comprise one or more optical elements that receive and propagate at least a portion of the primary electromagnetic radiation emitted from the one or more light emitting elements and substantially transmit the primary electromagnetic radiation through said one or more exit regions to the multilayer structure. The one or more optical elements may comprise one or more light guides having a surface with one or more extraction regions. In some aspects, the one or more extraction regions of the surface of the one or more light guides may be remote to the one or more light emitting elements. In certain constructions, the one or more illumination sources may further optionally comprise a reflection layer that redirects at least a portion of the primary electromagnetic radiation to the viewing hemisphere. The multilayer structure of the present teachings comprises one or more energy conversion layers that convert at least a portion of incident radiation to a secondary electromagnetic radiation that is at least partially emitted to the viewing hemisphere, wherein the incident radiation is at least one of the primary electromagnetic radiation or ambient electromagnetic radiation. In some instances, the one or more energy conversion layers may optionally comprise one or more light scattering materials that disperse at least a portion of radiation, in which the radiation is at least one of the primary electromagnetic radiation or the secondary electromagnetic radiation. The multilayer structure also comprises one or more diffusion layers that substantially increase optical scattering of at least a portion of radiation, wherein the radiation is at least one of the primary electromagnetic radiation, the secondary electromagnetic radiation, or ambient electromagnetic radiation. The one or more diffusion layers may, in some aspects, additionally fulfill the function of a protection layer that provides physical and chemical durability for the multilayer structure. The multilayer structure of the present teachings may be optically coupled to the one or more illumination sources, whereas in other instances may be optically decoupled. In some aspects, the multilayer structure of the present teachings may further comprise a reflection layer that redirects at least a portion of the secondary electromagnetic radiation to the viewing hemisphere, wherein the reflection layer is substantially transmissive of the primary electromagnetic radiation. In other aspects, the multilayer structure of the present teachings may also comprise one or more stability enhancement layers that increase photolytic and thermal stability of the multilayer structure. In another aspect, the multilayer structure may additionally comprise a protection layer that provides physical and chemical durability for the multilayer structure.

The present teachings also provide for a method for fabricating a luminous system. The method of the present teachings comprises providing one or more illumination sources that output, when powered, a primary electromagnetic radiation through one or more exit regions, applying a multilayer structure over at least a portion of at least one of the one or more exit regions, and overlaying one or more diffuse reflection layers over a surface of the multilayer structure to reflect at least a portion of ambient electromagnetic radiation to the viewing hemisphere, wherein the one or more diffuse reflection layers are optically decoupled from the multilayer structure. The emission and the reflection of the luminous system produce a first observed visible color when the one or more illumination sources are powered and a second observed visible color when the one or more illumination sources are non-powered. In some instances the first observed visible color and the second observed visible color may be substantially similar. The one or more illumination sources of the present teachings comprise one or more light emitting elements. The one or more illumination sources may also comprise a reflection layer that is disposed onto a surface of the one or more light emitting elements to redirect at least a portion of the primary electromagnetic radiation to the viewing hemisphere. The one or more illumination sources may further optionally comprise one or more optical elements that receive and propagate at least a portion of the primary electromagnetic radiation emitted from the one or more light emitting elements and substantially transmit the primary electromagnetic radiation through said one or more exit regions to the multilayer structure. The one or more optical elements may comprise one or more light guides having a surface with one or more extraction regions. In certain constructions, the one or more illumination sources may also comprise a reflection layer that is disposed onto a surface of the one or more optical elements to redirect at least a portion of the primary electromagnetic radiation to the viewing hemisphere. In some instances, the multilayer structure of the luminous system may be optically coupled to the one or more illumination sources, whereas in other instances the multilayer may be optically decoupled. The multilayer structure of the present teachings comprises one or more energy conversion layers that convert at least a portion of incident radiation to a secondary electromagnetic radiation that is at least partially emitted to the viewing hemisphere, wherein the incident radiation is at least one of the primary electromagnetic radiation or ambient electromagnetic radiation. In some instances, the one or more energy conversion layers may optionally comprise one or more light scattering materials that disperse at least a portion of radiation, in which the radiation is at least one of the primary electromagnetic radiation or the secondary electromagnetic radiation. The multilayer structure also comprises one or more diffusion layers that substantially increase optical scattering of at least a portion of radiation, wherein the radiation is at least one of the primary electromagnetic radiation, the secondary electromagnetic radiation, or ambient electromagnetic radiation. In some aspects, the multilayer structure may further comprise a reflection layer disposed onto a surface of the one or more energy conversion layers to redirect at least a portion of the secondary electromagnetic radiation to the viewing hemisphere, wherein the reflection layer is substantially transmissive of the primary electromagnetic radiation. In other aspects, the multilayer structure may also comprise one or more stability enhancement layers disposed onto at least a surface of the one or more energy conversion layers to increase photolytic and thermal stability of the multilayer structure. In another aspect, the multilayer structure may additionally comprise a protection layer that provides physical and chemical durability for the multilayer structure. The protection layer may be either disposed onto a surface of the one or more energy conversion layers or onto a surface of the one or more diffusion layers.

BRIEF DESCRIPTION OF THE DRAWINGS

The present teachings are illustratively shown and described in reference to the accompany drawings, in which.

DETAILED DESCRIPTION OF THE INVENTION

Figure 1:
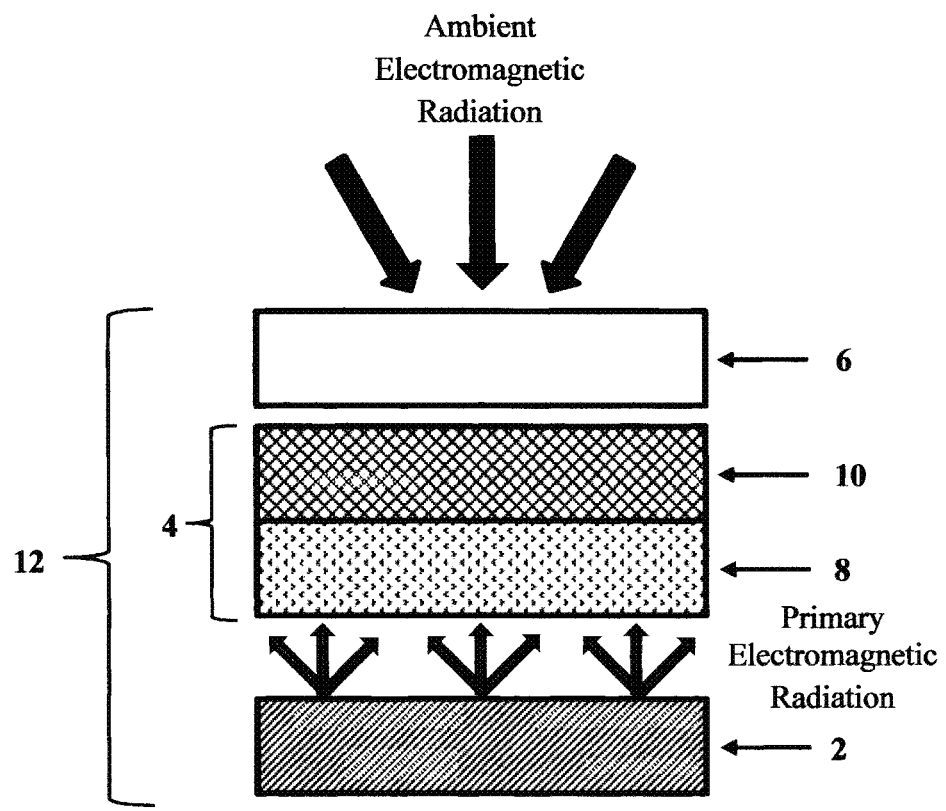
FIG. 1 is a schematic drawing of a luminous system according to one aspect of these teachings.

The present teachings are directed to the creation of high efficiency luminous systems that, when powered, can provide a first observed visible color primarily produced by the emission of the system and when non-powered, can provide a second observed visible color primarily produced by the reflection of the system.

For a better understanding of the disclosure, the following terms are herein defined:

The term "luminescence" is defined as the emission of electromagnetic radiation from any substance. Luminescence occurs from electronically excited states.

The electronic excited states of most organic molecules can be divided into singlet states and triplet states.

As used herein, the term "singlet state" refers to an electronic state wherein all electrons in the molecule are spin-paired.

As used herein, the term "triplet state" refers to an electronic state wherein one set of electron spins is unpaired.

The excited state is usually the first excited state. A molecule in a high vibrational level of the excited state will quickly fall to the lowest vibrational level of this state by losing energy to other molecules through collision. The molecule will also partition the excess energy to other possible modes of vibration and rotation.

"Luminescent materials" are those which exhibit luminescence, that is, emit electromagnetic radiation. Characterizing luminescent materials requires consideration of: (1) the excitation source, (2) the nature of the emission, and (3) whether or not additional stimulation is required to cause emission.

With regard to the excitation source, luminescent materials excited by electromagnetic radiation are referred to herein as "photoluminescent." Luminescent materials excited by electrical energy are referred to herein as "electroluminescent." Luminescent materials excited by a chemical reaction are referred to herein as "chemiluminescent."

With regard to the nature of the emission, this may be either fluorescence or phosphorescence. A "fluorescent" material stores electromagnetic radiation and releases it rapidly, generally in about $10^{-8}$ seconds or less. Fluorescence from organic molecules typically occurs from excited singlet states. Contrarily, a "phosphorescent" material stores electromagnetic radiation and releases it gradually, in about $10^{-6}$ seconds or greater.

"Primary Electromagnetic Radiation" refers to electromagnetic radiation emitted from one or more light emitting elements. The nature of the primary electromagnetic radiation emission may be infrared, visible, and/or ultraviolet electromagnetic radiation.

"Secondary Electromagnetic Radiation" refers to the emission of electromagnetic radiation from one or more photoluminescent materials, as defined above. The nature of the secondary electromagnetic emission may be infrared, visible, and/or ultraviolet electromagnetic radiation.

"Ambient Electromagnetic Radiation" refers to electromagnetic radiation that radiates from the surrounding environment that originates from any source that does not belong to that of the luminous system.

As used herein, "ultraviolet electromagnetic radiation" is characterized by electromagnetic radiation with wavelengths in the region less than about 400 nanometers ("nm").

As used herein, "visible electromagnetic radiation" is characterized by electromagnetic radiation with wavelengths in the region between about 400 nanometers ("nm") and about 700 nanometers ("nm").

As used herein, "infrared electromagnetic radiation" is characterized by electromagnetic radiation with wavelengths in the region greater than about 700 nanometers ("nm").

"Liquid carrier medium" is a liquid that acts as a carrier for materials distributed in a solid state and/or dissolved therein.

As used herein, a "formulation" is a liquid carrier medium, as defined above, comprising at least one polymer material either dissolved in and/or distributed in a solid state within the liquid carrier medium.

A "dispersion" is a formulation, as defined above, which additionally comprises a material that is a solid distributed in the liquid carrier medium.

A "solution" is a homogeneous mixture of at least two materials. A solution may be a formulation wherein an ingredient, such as one or more photoluminescent materials or a polymer, is dissolved in the liquid carrier medium, or a homogeneous mixture of one or more photoluminescent materials in a polymer.

A "solid state solution" of one or more photoluminescent materials and polymer is a homogeneous mixture of the two in the dry state. One possible way of achieving this is the mixture resulting from applying a formulation comprising one or more photoluminescent materials and polymer in solution in a liquid carrier and drying (removing solvent from) the one or more photoluminescent materials and polymer solution. Such a homogeneous mixture may also result from subjecting a mixture of one or more photoluminescent materials and polymer to elevated temperatures. Note that for a homogeneous mixture to form in a dry state, the polymer and one or more photoluminescent materials have to be compatible, otherwise a homogeneous mixture will not result.

A "photoluminescent formulation" is a formulation, as defined above, which further comprises one or more photoluminescent materials, as defined above.

A "stabilizing additive" is a material added to a formulation comprising solid particles, or a dispersion, to uniformly distribute, prevent agglomeration, and/or prevent settling of solid materials in the dispersion in the liquid carrier medium to result in an enhancement of luminous intensity. Such stabilizing additives generally comprise dispersants and/or rheology modifiers.

A "film" is a thin skin or membrane that can be rigid or flexible. An example of a film is a layer resulting from the application of a formulation and drying it. One or more layers can then constitute a film.

"Photolytic degradation" of a material is deterioration or change in properties of a material, such as observed visible color or luminescence characteristics, that is induced by electromagnetic radiation.

"Thermal degradation" is deterioration or change in properties that is induced by heat.

"Viewing hemisphere" refers to the area in which the primary and the secondary electromagnetic radiations are visually perceived.

The following disclosure describes luminous systems, as well as the methods and materials for creating such systems. These luminous systems possess a number of superior qualities, such as ability to provide a desired observed visible color when powered and a desired observed visible color when non-powered, high energy conversion efficiency, flexibility for tailoring the observed visible color, and capable of producing a wide gamut of observed visible color.

Generally speaking, the luminous system, according to the present teachings, employs the use of at least one or more illumination sources, a multilayer structure, and one or more diffuse reflection layers to produce a first observed visible color when the one or more illumination sources are powered, and a second observed visible color when the one or more illumination sources are non-powered. For example, as illustrated in FIG. 1, the luminous system 12 of the present teachings, comprises one or more illumination sources 2, a multilayer structure 4 that comprises one or more energy conversion layers 8 and one or more diffusion layers 10, and one or more diffuse reflection layers 6 that are optically decoupled from the multilayer structure 4. It should be noted that in most instances, the energy of the reflected electromagnetic radiation of the system is substantially less than the energy of the emitted electromagnetic radiation of the system when the one or more illumination sources are powered, thus the first observed visible color is perceived primarily as a result of the emission of the system. In contrast, the energy of the reflected electromagnetic radiation of the system is substantially greater than the energy of the emitted electromagnetic radiation of the system when the one or more illumination sources are non-powered, thus the second observed visible color is perceived primarily as a result of the reflection of the system. It should be further noted that in some cases, the luminous system may be designed such that the first observed visible color and the second visible color are substantially similar, whereas in other cases, substantially different.

The first observed visible color is a result of the emission and the reflection of the luminous system of the present teachings when the one or more illumination sources are powered. Still referring to FIG. 1, when powered, the one or more illumination sources 2 output a primary electromagnetic radiation to the multilayer structure 4. This primary electromagnetic radiation, along with ambient electromagnetic radiation if present, make up the incident radiation in which the one or more energy conversion layers 8 absorb and convert at least a portion into a secondary electromagnetic radiation that is at least partially emitted to the viewing hemisphere. The secondary electromagnetic radiation is further optically scattered by the one or more diffusion layers 10 and combines with any remaining unabsorbed incident radiation to produce the emission of the luminous system 12. Furthermore, the reflection of the luminous system 12 is produced by the ambient electromagnetic radiation that is redirected by the one or more diffuse reflection layers 6 to the viewing hemisphere. The combination of this emission and reflection of the luminous system 12 produce the first observed visible color, in which the emission of the luminous system being the dominant component of the first observed visible color.

The second observed visible color is a result of the emission and the reflection of the luminous system of the present teachings when the one or more illumination sources are non-powered. Still referring to FIG. 1, when the one or more illumination sources 2 are non-powered, the incident radiation upon the one or more energy conversion layers 8 comprises the ambient electromagnetic radiation, if present, that is transmitted to such layers. The one or more energy conversion layers 8 absorb and convert at least a portion of the incident radiation into a secondary electromagnetic radiation that is at least partially emitted to the viewing hemisphere. The secondary electromagnetic radiation is further optically scattered by the one or more diffusion layers 10 and combines with any remaining unabsorbed incident radiation to produce the emission of the luminous system 12. Furthermore, the reflection of the luminous system 12 is produced by the ambient electromagnetic radiation that is redirected by the one or more diffuse reflection layers 6 to the viewing hemisphere. The combination of this emission and reflection of the luminous system 12 produce the second observed visible color, in which the reflection of the luminous system being the dominant component of the second observed visible color.

The one or more illumination sources of the luminous system of the present teachings output through one or more exit regions, when powered, a primary electromagnetic radiation that is at least partially converted into a secondary electromagnetic radiation by the one or more energy conversion layers of the multilayer structure of the system. The one or more exit regions of the one or more illumination sources are regions that are designed for the output of the primary electromagnetic radiation to egress from the one or more illumination sources in the direction of the multilayer structure. The one or more illumination sources comprise one or more light emitting elements that provide a primary electromagnetic radiation having a principle wavelength that partially or fully overlaps with the absorption spectrum of at least one of the one or more energy conversion layers of the multilayer structure. Acceptable one or more light emitting elements may include any element, along with any typical associated packaging or housing, that is capable of providing electromagnetic radiation, such as, but not limited to, a chemiluminescent source or an electroluminescent source, e.g. a light emitting diode (LED). It should be noted that in the instances where the luminous system of the present teachings comprises more than one illumination source, it is not required that each illumination source be the same, rather multiple and distinct illumination sources may be used within the same luminous system.

In yet a further aspect, the one or more illumination sources may also comprise one or more optical elements that receive and propagate at least a portion of the primary electromagnetic radiation that is emitted from the one or more light emitting elements and further substantially transmit the primary electromagnetic radiation to the multilayer structure. In such instances, the one or more optical elements may be either optically coupled to, i.e. no medium having a substantially lower refractive index, e.g. air, exists between the one or more light emitting elements and the one or more optical elements, or optically decoupled from, i.e. a medium having a substantially lower refractive index, e.g. air, exists between the one or more light emitting elements and the one or more optical elements, that of the one or more light emitting elements. Acceptable optical elements may include, for example, lenses, prisms, light guides, etc., and may have refractive and/or diffractive characteristics.

Figure 2:
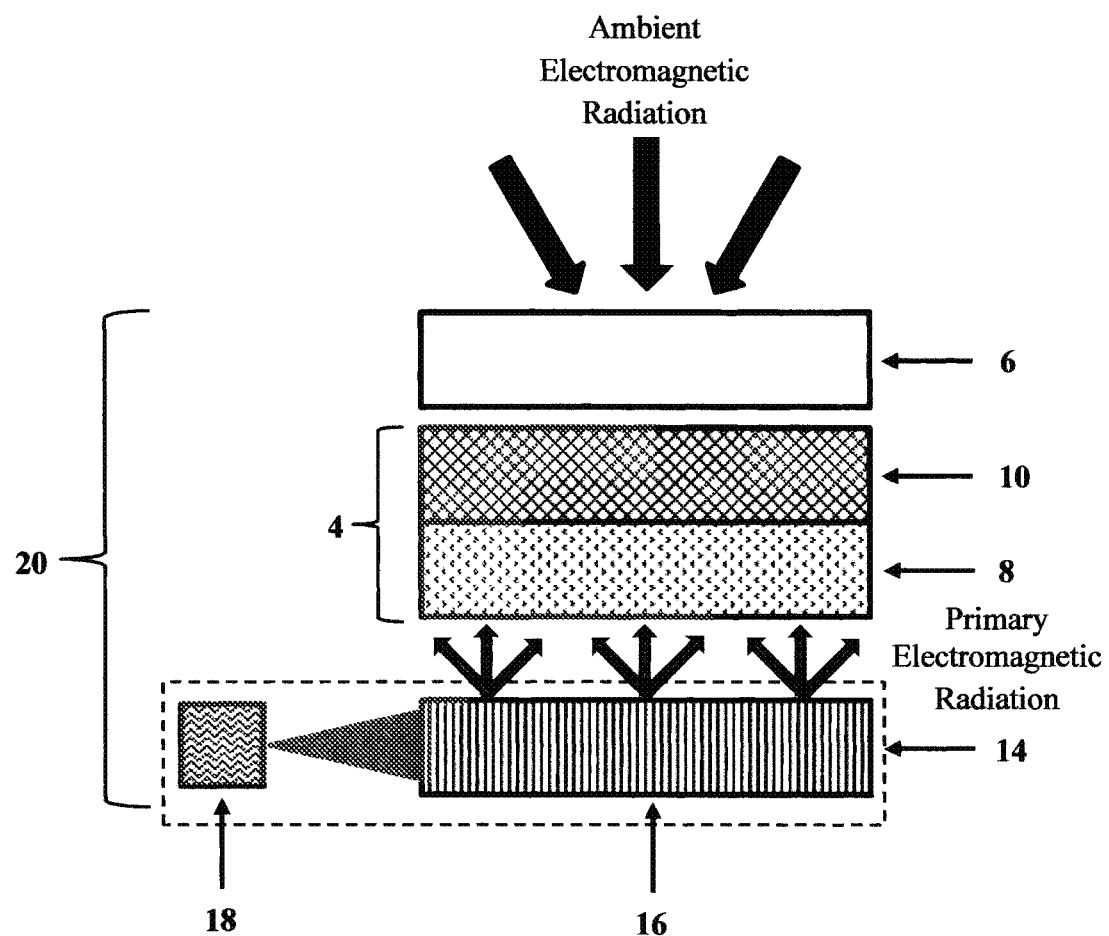
FIG. 2 is a schematic drawing of a luminous system according to another aspect of these teachings.

In instances where the one or more optical elements are one or more light guides, as illustrated in FIG. 2, the one or more light guides 16 have a top surface and a bottom surface, in which the bottom surface includes one or more extraction regions. In this aspect, the one or more extraction regions function to direct light towards the one or more exit regions of the one or more illumination sources 14, such that, at least a portion of the primary electromagnetic radiation provided by the one or more light emitting elements 18, when powered, is substantially emitted and transmitted through the one or more exit regions of the one or more illumination sources 14 to the multilayer structure 4. The one or more light guides comprise substantially transparent material(s), such as, but not limited to, plastic or glass, with minimal, if any, optical absorption or elastic scattering of the primary electromagnetic radiation emitted from the one or more light emitting elements. Acceptable substantially transparent material(s) include, but are not limited to, borosilicate or pyrex glasses, as well as plastic materials, such as bisphenol A polycarbonate, poly(methylmethacrylate), other acrylic copolymers, polyurethanes, polystyrenes, polyesters, other glassy polymers, etc. The one or more light guides of the present teachings may be flexible or rigid, as well as planar or non-planar in geometry, so that the one or more light guides may be tailored to provide the most suitable illumination source(s) for the luminous system for which they are incorporated within.

It should be noted that, unlike the one or more light guides of the present teachings, most light guides are designed to propagate single optical modes, which require such light guides to comprise layers, generally referred to as cladding layers, that surround the substantially transparent material in order to constrain the number of optical modes disseminated within the light guide, e.g. U.S. Pat. Nos. 7,639,916 and 8,128,272 and U.S. patent application Ser. Nos. 12/421,554 and 13/289,442. However, given that the one or more light guides of the present teachings are designed to receive and propagate multiple optical modes, there is no need for, and thus no inclusion of, cladding layers within the one or more light guides of the present teachings.

Still referring to FIG. 2, in general, the primary electromagnetic radiation emitted from the one or more light emitting elements 18 is directed into one or more edges of the one or more light guides 16, the one or more edges being perpendicular to the top and the bottom surfaces. In FIG. 2, the one or more light emitting elements 18 are separated, or optically decoupled, from the one or more light guides 16, i.e. a medium having a substantially lower refractive index, e.g. air, exists between the one or more light emitting elements 18 and the one or more light guides 16 of the one or more illumination sources 14. In this instance, additional optical element(s), such as lenses and/or prisms, may be used to aid in directing the primary electromagnetic radiation into one or more edges of the one or more light guides. Alternatively, the one or more light emitting elements may be optically coupled to the one or more light guides, i.e. no medium having a substantially lower refractive index, e.g. air, exists between the one or more light emitting elements and the one or more light guides. In another aspect, the primary electromagnetic radiation may originate within the one or more light guides as a consequence of the one or more light emitting elements being embedded within the one or more light guides themselves.

Furthermore, given that the material of the one or more light guides has a refractive index that is significantly greater than that of air, preferably at least equal to about 1.3, internal reflection causes the primary electromagnetic radiation to be substantially constrained within the top and bottom surfaces of the one or more light guides until such primary electromagnetic radiation encounters a means by which its propagation vector is changed to become substantially normal to a surface of the one or more light guides. Internal reflection occurs when a ray of light passing through a medium reaches a boundary at which a medium of lower refractive index is encountered. In accordance with Snell's Law, the light ray will be refracted away from the normal to the interface. As the angle of incidence increases, a point will be reached where the ray is refracted to an angle of 90°, i.e. the light will remain in the original medium. This angle is defined as the critical angle. Rays incident to the interface at angles greater than or equal to the critical angle will be totally internally reflected causing the light to travel generally in a direction parallel to the interface. However, when the propagation vector is changed to become substantially normal to a surface of the one or more light guides, the primary electromagnetic radiation will exit the one or more light guides at such region(s). As a result, the one or more extraction regions of the one or more light guides allow for at least a portion of the primary electromagnetic radiation to substantially transmit through the one or more exit regions of the one or more illumination sources to that of the multilayer structure, and furthermore may be displaced at a significant distance from that of the one or more light emitting elements.

A number of methods may be used to extract the primary electromagnetic radiation from the one or more light guides such that the radiation can transmit through at least a portion of the top surface, the bottom surface, or both, of the one or more light guides as a result of the one or more extraction regions, thus enabling the primary electromagnetic radiation to uniformly emit over a significant area to that of the multilayer structure. In some instances, the one or more extraction regions may take the form of a predetermined shape. In a preferred method, at least a portion of the top surface, the bottom surface, or both, of the one or more light guides is roughened to create the one or more extraction regions such that at least a portion of the primary electromagnetic radiation may exit and transmit to the multilayer structure. In one instance, roughening can be accomplished by surface deformation, such as etching. In another instance, roughening can be accomplished by the use of discrete prismatic structures that can be embossed or molded within the one or more light guides. In yet another instance, roughening can include rendering a thin layer of coating material having substantially the same refractive index with one or more light scattering materials substantially dispersed therein, onto the desired one or more extraction regions of the one or more light guides. Suitable coating materials include, but are not limited to, polyacrylates, polycarbonates, polyurethanes, or other polymers. Acceptable light scattering materials include, but are not limited to, non-absorbing materials with a substantially different refractive index than the coating material, such as titanium dioxide pigment, mica particles, or hollow or solid glass spheres. Although other methods of extraction may be utilized within the present teachings, it should be noted that the use of a diffraction grating which results in spectral dispersion, is not a preferred method to produce the one or more extraction regions of the one or more light guides.

The one or more illumination sources may comprise various combinations among the one or more light guides with that of the one or more light emitting elements that are within the scope of the present teachings. In its simplest form, an individual light emitting element may emit primary electromagnetic radiation into a single light guide. In another instance, one light emitting element may emit primary electromagnetic radiation into multiple light guides. In a further instance, multiple light emitting elements may emit primary electromagnetic radiation into one light guide.

In yet a further aspect of the present teachings, the one or more illumination sources may further comprise a reflection layer, having planar and/or non-planer surfaces, that redirects at least a portion of the primary electromagnetic radiation provided by the one or more light emitting elements, when powered, to the viewing hemisphere. In most aspects, the reflection layer is substantially opaque, such that at least a portion of the primary electromagnetic radiation that would otherwise be emitted and/or transmitted in a backward propagating direction substantially diverts forward towards the viewing hemisphere. In some instances, the reflection layer may be optically coupled to at least a portion of a surface of the one or more light emitting elements, i.e. no medium having a substantially lower refractive index, e.g. air, exists between the one or more light emitting elements and the reflection layer, whereas in other instances, optically decoupled, i.e. a medium having a substantially lower refractive index, e.g. air, exists between the one or more light emitting elements and the reflection layer. In other instances, where the one or more illumination sources also comprise one or more optical elements, the reflection layer may alternatively be optically coupled to, i.e. no medium having a substantially lower refractive index, e.g. air, exists between the one or more optical elements and the reflection layer, or optically decoupled from, i.e. a medium having a substantially lower refractive index, e.g. air, exists between the one or more optical elements and the reflection layer, the one or more optical elements. In some aspects, the reflection layer may comprise a plurality of alternate layers of non-metallic materials having high and low dielectric constants.

In addition to the one or more illumination sources, the luminous system of the present teachings also comprises a multilayer structure that is disposed over at least a portion of one or more exit regions of the one or more illumination sources. The multilayer structure may in some instances be optically coupled to the one or more illumination sources, i.e. no medium having a substantially lower refractive index, e.g. air, exists between the one or more illumination sources and the multilayer structure, whereas in other instances optically decoupled, i.e. a medium having a substantially lower refractive index, e.g. air, exists between the one or more illumination sources and the multilayer structure. The multilayer structure comprises one or more energy conversion layers that convert at least a portion of incident radiation to a secondary electromagnetic radiation that is at least partially emitted to the viewing hemisphere and one or more diffusion layers that substantially increase optical scattering of at least a portion of the primary, the secondary, and/or ambient electromagnetic radiation. In further aspects, the multilayer structure may further comprise one or more stability enhancement layers, a reflection layer, a protection layer, or any combinations thereof.

The one or more energy conversion layers of the multilayer structure of the present teachings absorb at least a portion of incident electromagnetic radiation and convert such radiation to a secondary electromagnetic radiation having a different spectrum, generally characterized by a higher average wavelength, that is at least partially emitted to the viewing hemisphere. In instances where the one or more illumination sources are powered, the incident electromagnetic radiation upon the one or more energy conversion layers comprise the primary electromagnetic radiation that is provided by the one or more illumination sources, as well as ambient electromagnetic radiation, if present, that is transmitted to the one or more energy conversion layers. In contrast, the incident electromagnetic radiation upon the one or more energy conversion layers where the one or more illumination sources are non-powered, comprise ambient electromagnetic radiation that is transmitted to the one or more energy conversion layers. The one or more energy conversion layers comprise one or more photoluminescent materials in which at least one of the one or more photoluminescent materials have an absorption spectrum that overlaps with at least a portion of the incident electromagnetic radiation. The one or more photoluminescent materials of the one or more energy conversion layers of the multilayer structure comprise one or more phosphorescent materials, one or more fluorescent materials, or any combinations thereof.

Suitable one or more photoluminescent materials useful in the one or more energy conversion layers include, but are not limited to, rylenes, xanthenes, porphyrins, cyanines, violanthrones, or others, preferably photoluminescent materials having high quantum yield properties. Rylene dyes include, but are not limited to, perylene esters or diimide materials, such as 3-cyanoperylene-9,10-dicarboxylic acid 2',6'-diiosopropylanilide, 3,4,9,10-perylene tetracarboxylic acid bis (2',6'-diisopropyl) anilide, 1,6,7,12-tetraphenoxy-N,N'-di(2', 6'-diisopropylphenyl)-3,4:9,10-perylenediimide, etc. Xanthene dyes include, but are not limited to, Rhodamine B, Eosin Y, or fluorescein. Porphyrin dyes include, for example, 5,10,15,20-tetraphenyl-21H,23H-tetraphenylporphine, 2,3, 7,8,12,13,17,18-octaethyl-21H,23H-porphine, etc. Cyanine dyes include, for example, 3,3'-diethyloxadicarbocyanine iodide, 3,3'-diethyloxacarbocyanine iodide, IR 775, IR 792, etc. Violanthrones include, for example, violanthrone 78, violanthrone 79, etc.

Generally speaking, the luminous system of the present teachings, utilize at least the absorption and emission properties of the one or more photoluminescent materials of the one or more energy conversion layers to generate, by way of energy conversion, the secondary electromagnetic radiation which combines with any remaining unconverted incident electromagnetic radiation upon the one or more energy conversion layers to produce the emission of the luminous system. The emission of the luminous system is a component of the observed visible color of the system which, in instances where the one or more illumination sources are powered, primarily produces the first observed visible color as a result of the energy of the primary electromagnetic radiation output from the one or more illumination sources.

In using energy conversion, as opposed to other common mechanisms, it was found that energy loss is substantially minimized and as a result provides greater efficiency in producing emission of the luminous system of the present teachings, when the one or more illumination sources of the system are powered, without requiring a substantial amount of primary electromagnetic radiation. Therefore, the luminous system of the present teachings is not only considerably efficient in generating secondary electromagnetic radiation, but also capable of providing a more luminous secondary electromagnetic radiation when the one or more illumination sources are powered, independent of the one or more light emitting elements utilized.

Figure 3:
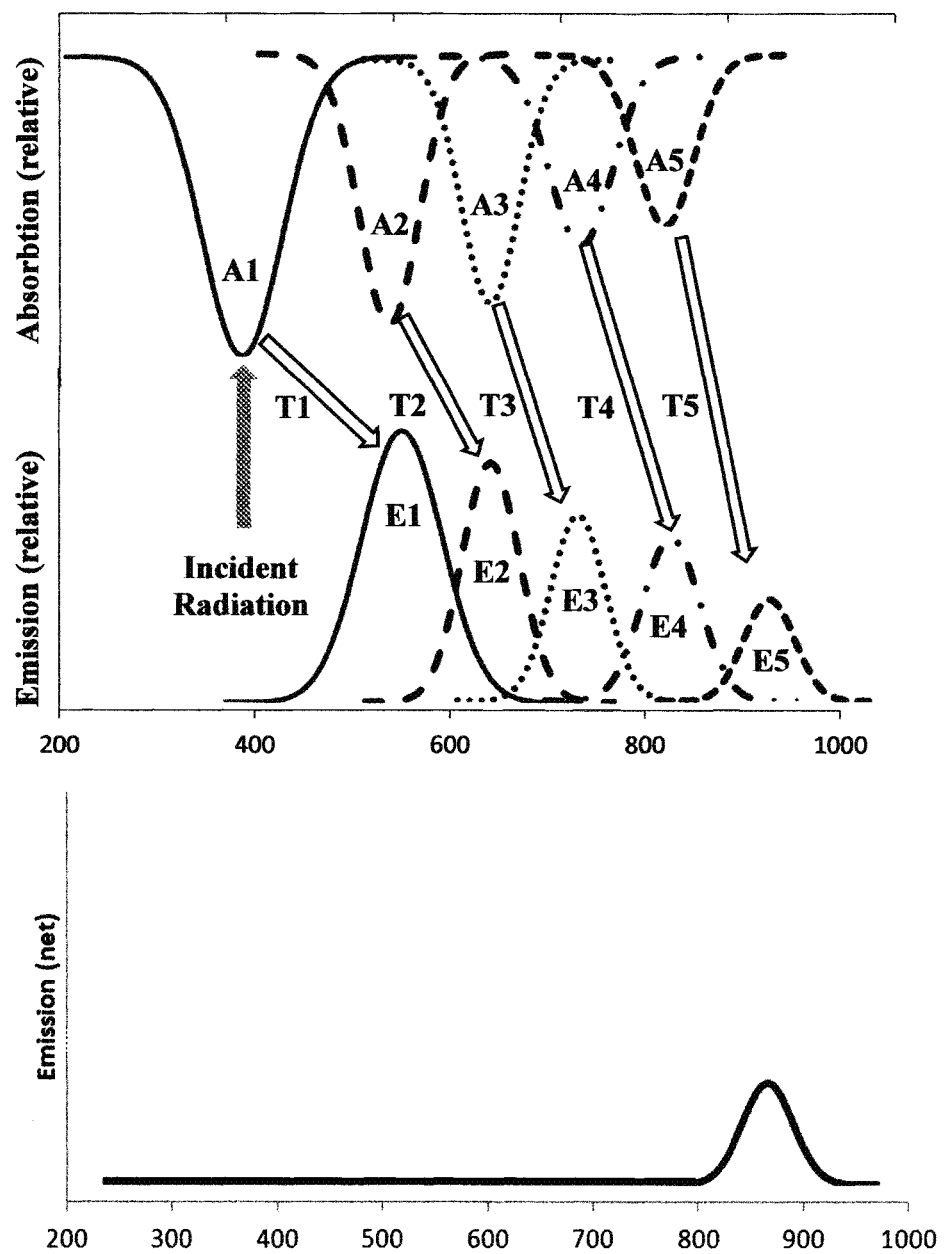
FIG. 3 is a schematic that describes one method of energy conversion, i.e. the cascade of emission from one photoluminescent material to another.

One general method of energy conversion used in the present teachings is represented in FIG. 3. With reference to FIG. 3, the electromagnetic energy spectrum of incident electromagnetic radiation is converted into a new electromagnetic radiation, i.e. secondary electromagnetic radiation, having a spectrum generally of a higher average wavelength, through a cascade of absorption/emission events by the one or more photoluminescent materials of the one or more energy conversion layers. Each individual photoluminescent material is characterized by a radiation energy absorption spectrum Ai, a radiation energy emission spectrum Ei, and a characteristic time constant Ti between radiation absorption and radiation emission (where i=1, 2, 3 . . . ). Preferably, some or all of the secondary electromagnetic radiation produced by this method is visible electromagnetic radiation.

Further referring to FIG. 3, in one aspect of this energy conversion method, incident electromagnetic radiation that falls within the absorption spectrum of a first photoluminescent material, characterized by energy absorption spectrum A1, energy emission spectrum E1, and a characteristic time constant T1 between energy absorption and energy emission, is substantially absorbed. Generally, the average wavelength of radiation emission spectrum E1 is higher than the average wavelength of radiation absorption spectrum A1. This difference in wavelengths is referred to as the Stokes shift, and the energy corresponding to this difference in wavelengths is referred to as Stokes loss. The emission of the first photoluminescent material, E1, representing a longer wavelength, that is not characteristic of the incident electromagnetic radiation, is thus produced via conversion of the incident radiation absorbed.

Still referring to FIG. 3, in another aspect of this energy conversion method, a second photoluminescent material may be used to absorb at least a portion of the emission of the first photoluminescent material, that is, E1. The second photoluminescent material is characterized by energy absorption spectrum A2, energy emission spectrum E2, and a characteristic time constant T2 between energy absorption and energy emission. The second photoluminescent material emits radiation and exhibits a Stokes shift to a yet higher wavelength than the first photoluminescent material. Additional one or more photoluminescent materials having appropriate Stokes shifts may be chosen to further convert the radiation of at least one of the first or second photoluminescent material until the desired emission wavelength is reached. These additional photoluminescent materials are characterized by radiation absorption spectra A3, A4, A5, etc., radiation emission spectra, E3, E4, E5, etc., and characteristic time constants between radiation absorption and radiation emission T3, T4, T5, etc. In this manner, the incident electromagnetic radiation can be used to produce an emission characterized by a blue color, for example, and then further to generate green, yellow, orange, or red light.

Figure 4:
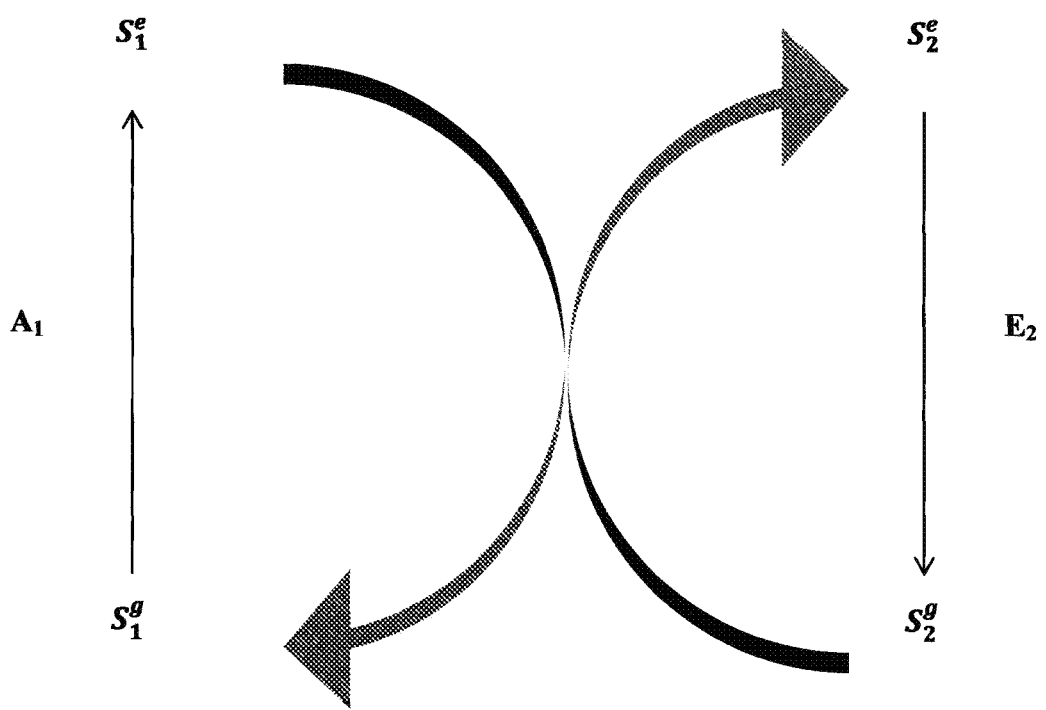
FIG. 4 is a schematic that describes another method of energy conversion, i.e. the energy transfer from one photoluminescent material to another by way of Förster resonance energy transfer.

While reabsorption of emitted radiation can be an effective mechanism for energy conversion, the transfer of energy does not require emission and reabsorption. Alternatively, the transfer of energy in energy conversion can occur through a Förster resonance energy transfer mechanism, as illustrated in FIG. 4. Förster resonance energy transfer most commonly occurs between organic singlet states, and the following discussion is in that context, although the application of the technique is not limited to singlet-singlet transfer. It should be noted that for Förster transfer to occur among certain photoluminescent materials, the electronic spin also has to be conserved. With reference to FIG. 4, $S_1^g$ represents the state of a first photoluminescent material, before absorbing incident electromagnetic radiation, i.e. the non-excited state, $S_1^e$ represents the state of the first photoluminescent material after absorption (the excited state), and $A_1$ represents the energy of the photon of incident electromagnetic radiation absorbed by the first photoluminescent material. Likewise, $S_2^g$ represents the non-excited state of a second photoluminescent material, $S_2^e$ represents the excited state of the second photoluminescent material, and $E_2$ represents the emission of radiation from the second photoluminescent material corresponding to the transition from its excited state back to its non-excited state. With continued reference to FIG. 4, the second photoluminescent material can be excited from $S_2^g$ to $S_2^e$ by transfer of energy from $S_1^e$ without the emission of radiation from the first photoluminescent material. As a result, the emission $E_2$ is produced from direct excitation of the first photoluminescent material. Förster resonance energy transfer can occur where the electronic characteristics of the emission of a first photoluminescent material and the absorption of a second photoluminescent material are properly chosen, such that the transfer of electronic energy can occur by dipolar coupling without requiring the emission of a photon by the first photoluminescent material. Förster resonance energy transfer requires that the photoluminescent materials undergoing the transfer of the electronic energy be close enough to experience their respective dipolar fields. As a result, Förster resonance energy transfer requires a significantly higher concentration of the second photoluminescent material than is conventionally used for other methods of energy conversion. It should be noted that in some cases, where the emission of the first photoluminescent material and the absorption of the second photoluminescent material are insufficient to support Förster resonance energy transfer, such energy transfer can still occur with the intervention of one or more additional photoluminescent materials that act as a mediator and thus provide the necessary emission and absorption overlap.

Generally speaking, to maximize the conversion efficiency of the one or more photoluminescent materials, light scattering materials should be absent from the one or more energy conversion layers. However, in certain situations it may be advantageous to include such materials, wherein the construction of the one or more energy conversion layers are managed to maximize the conversion and extraction of the secondary electromagnetic radiation. Thus, in some instances, the one or more energy conversion layers may also comprise one or more light scattering materials that disperse at least a portion of the primary electromagnetic radiation, the secondary electromagnetic radiation, or both. In doing such, the one or more light scattering materials increase the effective path length of the primary electromagnetic radiation and/or the secondary electromagnetic radiation within the one or more energy conversion layers, as well as provide homogenization of the radiation. The scattering of the primary electromagnetic radiation serves to increase the amount of such radiation absorbed and converted by the one or more photoluminescent materials of the one or more energy conversion layers. The scattering of the secondary electromagnetic radiation serves to redirect such radiation, which would otherwise become trapped within the one or more energy conversion layers by way of internal reflection, to that of the viewing hemisphere.

Once proper materials and concentrations have been identified, a variety of methods can be used to prepare the one or more effective energy conversion layers. Such methods include, for example, coating a layer, the layer being generally planar and prepared from a formulation with the one or more photoluminescent materials and polymer substantially dispersed or dissolved in a liquid carrier medium, onto a carrier substrate or onto a different layer of the multilayer structure. Another example includes, coating the layer directly onto at least a portion of at least one of the one or more exit regions of the one or more illumination sources. Such coatings can be deposited for example, by painting, spraying, slot coating, dip coating, roller coating, bar coating, or printing methods, such as screen printing, screen gravure, screen flexographic, etc. Alternatively, the one or more energy conversion layers may be prepared by methods that do not use a liquid carrier medium. For example, one or more photoluminescent materials and polymer can be converted to an energy conversion layer by extrusion, injection molding, compression molding, calendaring, or thermoforming. As long as the polymer selected is compatible with the one or more photoluminescent materials, a solid state solution can be formed. In the instances where the one or more energy conversion layers are prepared by either coating a layer onto a carrier substrate or from a solid state solution, such one or more energy conversion layers can be deposited onto at least one of the one or more exit regions of the one or more illumination sources either by laminating or otherwise optical coupling, or alternatively, by simple placement over at least one of the one or more exit regions without optical coupling. It should be noted that some of these methods can be particularly useful in producing non-planar layers. In the instances where more than one energy conversion layer is prepared, each energy conversion layer can be sequentially coated, or the individual layers can be separately prepared and later laminated or embossed together. In all cases in which the one or more luminous systems utilize more than one energy conversion layer, the energy conversion layers will only function properly if they are properly ordered.

Additional additives such as, but not limited to, dispersants, wetting agents, defoamers, leveling agents, or combinations thereof, may be added to the formulation used for coating the one or more energy conversion layers to aid in the dispersion of the one or more photoluminescent materials within the polymer and the coating of the formulation itself. Such dispersants, wetting agents, defoamers, and leveling agents may each be oligomeric, polymeric, or copolymeric materials or blends containing surface-active (surfactant) characteristic blocks, such as, for example, polyethers, polyols, or polyacids. Furthermore, such additives may also be selected so as to minimize the scattering of electromagnetic radiation and use of excessive energy so that the emission of the one or more photoluminescent materials is maximized. Each such material must be tested to assure that it does not cause aggregation of the one or more photoluminescent materials, and that the material does not react, either thermally or photochemically, with the one or more photoluminescent materials of the one or more energy conversion layers.

In addition, other materials may be added to the one or more energy conversion layers to increase the photolytic stability, e.g. UV absorbers, antioxidants, free radical quenchers, hindered amine light stabilizers (HALS), etc. Singlet molecular oxygen is presumed to be an important reactive species in the photolytic degradation of photoluminescent material(s). While reducing the concentration of oxygen is an effective deterrent to the creation of singlet oxygen, this species can also be quenched by a number of additives thereby preventing it from reacting with the photoluminescent material(s). Such quenchers should be placed in the layer in which the singlet oxygen is most readily formed, that being the one or more energy conversion layers. Examples of singlet oxygen quenchers include, but are not limited to, 2,2,6,6-tetramethyl-4-piperidone, 1,4-diazabicyclo[2.2.2]octane, or diphenylsulfide.

The multilayer structure of the luminous system of the present teachings further comprises one or more diffusion layers that substantially increase optical scattering of a least a portion of the primary electromagnetic radiation, the secondary electromagnetic radiation, the ambient electromagnetic radiation, or any combinations thereof. In general, the increase of optical scattering by the one or more diffusion layers enables homogenization of electromagnetic radiation. The one or more diffusion layers are disposed over a surface of the one or more energy conversion layers, such that the one or more diffusion layers substantially increase optical scattering of radiation, thereby providing homogenization and mixing of unconverted incident electromagnetic radiation with at least a portion of radiation emitted by the one or more energy conversion layers, i.e. the secondary electromagnetic radiation. In most instances, the one or more diffusion layers are optically coupled to the one or more energy conversion layers, i.e. no medium having a substantially lower refractive index, e.g. air, exists between the one or more diffusion layers and the one or more energy conversion layers, and as a result are also capable of redirecting the secondary electromagnetic radiation to the viewing hemisphere, thereby reducing the amount of radiation that would otherwise become trapped within the one or more energy conversion layers by internal reflection. In this aspect, the one or more diffusion layers further function as diffuse reflectors that can redirect at least a portion of the primary and secondary electromagnetic radiation back into the one or more energy conversion layers, thereby increasing the effective optical path length of the one or more energy conversion layers. Furthermore, the one or more diffusions layers may additionally fulfill, in some instances, the function of a protection layer to provide physical and chemical durability for the multilayer structure.

In some instances, the one or more diffusion layers may comprise one or more light scattering materials separated into discrete domains that possess significantly different optical indices of refraction, which in most cases are due to the materials having different densities. In addition, the sizes of the domains have a significant effect on the efficiency of optical scattering, with larger domains providing more scattering. The one or more diffusion layers can be produced in a variety of polymers, for example, acrylates, polyurethanes, polycarbonates, polyvinyl chlorides, silicone resins, or other common polymers. The polymer(s) for the one or more diffusion layers are usually chosen based on compatibility with other layers of the multilayer structure to which it will be laminated or otherwise optically coupled, so as to provide good adhesion. In particular, it is important that the polymer(s) of the one or more diffusion layers do not substantially absorb, if at all, the incident radiation or the secondary electromagnetic radiation. Suitable light scattering materials that can be incorporated into the polymer of the one or more diffusion layers include, but are not limited to, titanium dioxide, mica, or hollow or solid glass microspheres. Furthermore, small domains of incompatible polymers incorporated into the polymer of the one or more diffusion layers may also serve as the one or more light scattering materials.

Once proper materials and concentrations have been identified, a variety of methods can be used to prepare the one or more diffusion layers. Such methods include, for example, coating a layer, the layer being generally planar and prepared from a formulation with one or more light scattering materials and polymer substantially dispersed in a liquid carrier medium, onto a carrier substrate or onto a different layer of the multilayer structure. Such coatings can be deposited for example, by painting, spraying, slot coating, dip coating, roller coating, bar coating, or printing methods, such as screen printing, screen gravure, screen flexographic, etc. Additional additives such as, but not limited to, dispersants, wetting agents, defoamers, leveling agents, or combinations thereof, may be added to the formulation used for coating such materials to aid in the dispersion of the one or more light scattering materials and the coating of the formulation itself. Such dispersants, wetting agents, defoamers, and leveling agents may each be oligomeric, polymeric, or copolymeric materials or blends containing surface-active (surfactant) characteristic blocks, such as, for example, polyethers, polyols, or polyacids. Alternatively, the one or more diffusion layers may be prepared by methods that do not use a liquid carrier medium. For example, one or more light scattering materials and polymer can be converted to one or more diffusion layers by extrusion, injection molding, compression molding, calendaring, or thermoforming. In the instances where the one or more diffusion layers are prepared by either coating a layer onto a carrier substrate or methods that do not use a liquid carrier medium, such one or more diffusion layers can be deposited over a surface of the one or more energy conversion layers either by laminating or otherwise optical coupling. In the instances where more than one diffusion layer is prepared, each diffusion layer can be sequentially coated, or the individual layers can be separately prepared and later laminated or embossed together.

In other instances, the one or more diffusion layers may comprise a patterned plastic diffuser, i.e. an embossed structure in the surface of a plastic sheet that is designed to provide optical homogenization. Such patterned plastic diffusers are typically prepared by extrusion of a preformed sheet using a patterned die. Alternatively, a patterned plastic diffuser can be prepared by recording a holographic image of a diffuser in a holographic recording medium, thereby resulting in a holographic diffuser. A holographic diffuser may be recorded to produce a surface pattern, or may be recorded through the volume of the holographic recording medium. Such holographic diffusers are generally preferred given their low optical losses due to back scattering in contrast to conventional diffusers.

Figure 5:
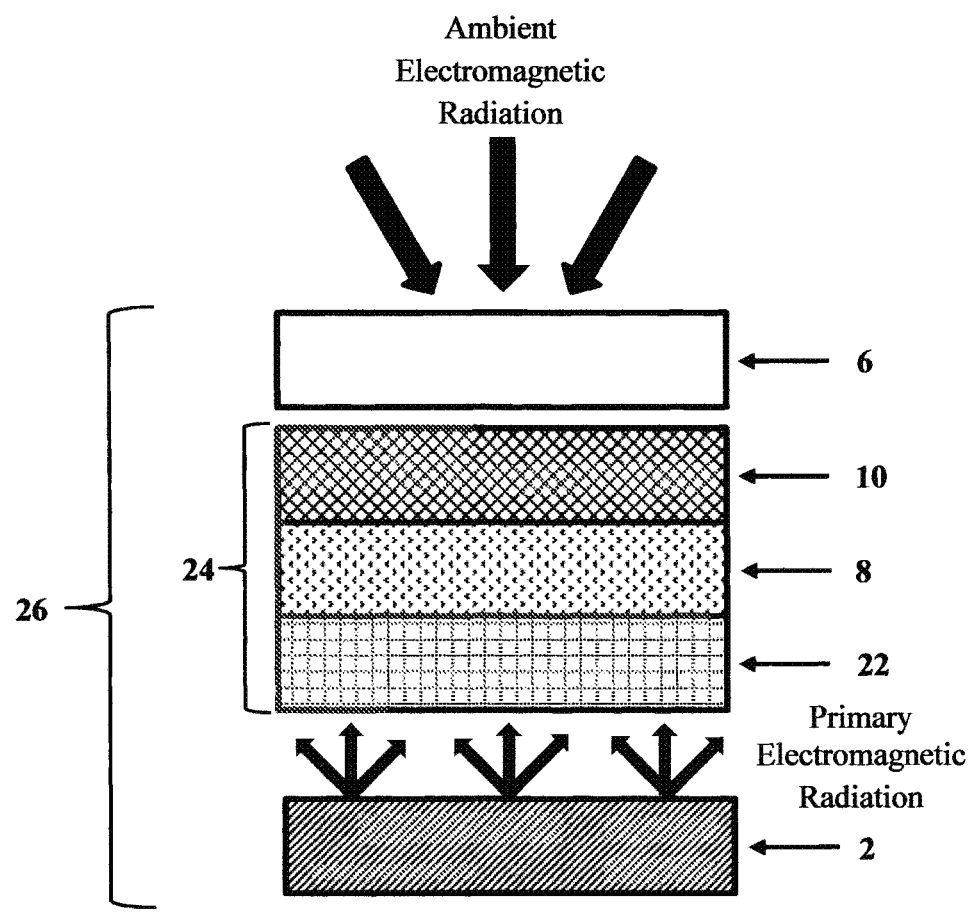
FIG. 5 is a schematic drawing of a luminous system according to a further aspect of these teachings.

Many organic photoluminescent materials suffer from photolytic degradation, either as solutions in a solvent or as a homogeneous mixture with a polymer when irradiated in the presence of air. In some cases, the degradation can be traced to the decomposition of a surrounding polymeric matrix, which can generate free radical intermediates that attack the molecules of the photoluminescent material(s). Some polymers contain UV absorbing chromophores that, after excitation, can sensitize the formation of singlet oxygen. In some cases, the photoluminescent material(s) can sensitize its own decomposition through the generation of singlet oxygen. Singlet oxygen can be generated by energy transfer from a triplet state of an excited dye to ground state (triplet) oxygen. For example, while fluorescent materials generate very few triplet species in their photophysics, the small amount that occurs can effectively transfer energy to available molecular oxygen to generate reactive singlet oxygen. This species can then attack nearby photoluminescent molecules to generate non-photoluminescent products. In addition, the choice of polymer matrix can affect the lifetime of singlet oxygen. Citations have been made about the beneficial effects of the presence of oxygen. For example, in "Photodegradation of Polymer-Dispersed Perylene Di-imide Dyes," by Nobuaki Tanaka, et al., Applied Optics, Vol 45 (2006), pp. 3846-51, it is reported that fluorescent material can also degrade by photoreduction mechanisms, in which case available oxygen can both compete for the reductant, as well as reoxidize the reduced fluorescent material. The authors identify that the presence of oxygen in the vicinity of the fluorescent material can reduce the rate of photolytic degradation. In other words, preventing the transmission of oxygen can lead to more rapid degradation of the fluorescent material. Surprisingly, the opposite is found to be true. Specifically, it has been determined that certain polymer coatings when made from materials that are known to significantly retard the diffusion of oxygen have a dramatic impact on improving photolytic stability. Thus, to extend the stability of the one or more photoluminescent materials of the one or more energy conversion layers, the multilayer structure of the luminous system of the present teachings may further optionally comprise one or more stability enhancement layers, e.g. as depicted in FIG. 5. Furthermore, in cases where the one or more energy conversion layers of the multilayer structure experience a significant flux density, e.g., greater than about 500 watts/m$^2$, for an extended period of time, the useful life of the one or more energy conversion layers can be extended with the use of one or more stability enhancement layers.

In utilizing one or more stability enhancement layers within the multilayer structure of the present invention, the one or more photoluminescent materials of the one or more energy conversion layers can be protected from light-induced (photolytic) degradation as well as thermal degradation so as to provide greater longevity to the one or more photoluminescent materials. Useful materials that can be used in the one or more stability enhancement layers include, but are not limited to, a number of materials commonly used today to inhibit the transmission of air, especially in applications such as food packaging. Such useful materials include, for example, polyvinyl alcohol, ethylene vinyl alcohol copolymers, polyvinyl chloride, polyvinylidene chloride copolymers (saran), nylons, acrylonitriles, polyethylene terephthalate polyester, polyethylene naphthalate, polytrimethyl terephthalate, liquid crystal polymers, transparent inorganic oxide coatings, nanocomposites, oxygen scavengers, aromatic polyketones, etc.

In one aspect of the present teachings, as illustrated in FIG. 5, the one or more stability enhancement layers 22 may be rendered onto a surface of the one or more energy conversion layers 8, thereby inhibiting diffusion of oxygen through the surface of the one or more energy conversion layers 8. However, in instances where the multilayer structure of the luminous system is optically coupled to the one or more illumination sources, such a construction as illustrated in FIG. 5, may not be preferred since diffusion of oxygen through the bottom surface of the one or more energy conversion layers is inhibited by the one or more illumination sources. In an alternative aspect of the present teachings, the one or more stability enhancement layers may be rendered onto the top surface of the one or more energy conversion layers, such that the one or more stability enhancement layers are interposed between the one or more diffusion layers and one or more energy conversion layers. In certain applications, it may be advantageous to have one stability enhancement layer rendered onto the top surface of the one or more energy conversion layers and another stability enhancement layer rendered onto the bottom surface of the one or more energy conversion layers.

Although it is preferable that the one or more stability enhancement layers be rendered as a discrete layer, as depicted in FIG. 5, it should be recognized that some functionality of the one or more stability enhancement layers can also be achieved within the one or more energy conversion layers themselves by suitable selection of the polymer matrix of the one or more energy conversion layers. Furthermore, in certain instances, where the one or more energy conversion layers are coated onto a suitably thick polyester carrier substrate, the carrier substrate can also provide some functionality in retarding the diffusion of oxygen through the one or more energy conversion layers.

Figure 6:
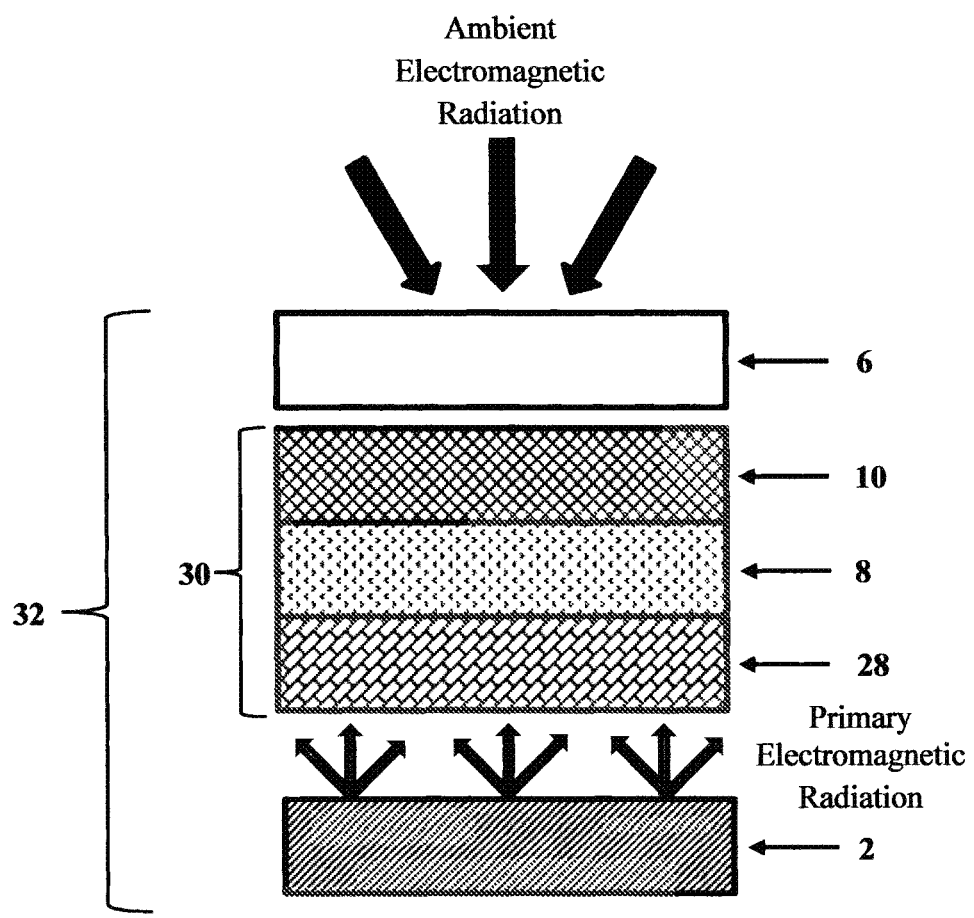
FIG. 6 is a schematic drawing of a luminous system according to another aspect of these teachings.

The secondary electromagnetic radiation should substantially emit towards the hemisphere on the forward-propagating side of the one or more luminous systems, i.e. the viewing hemisphere. Given that the one or more photoluminescent materials within the one or more energy conversion layers are characterized as isotropic Lambertian emitters, the secondary electromagnetic radiation emits in various directions that result in some portion of backward propagation. Although use of one or more photoluminescent materials that are in solid state solution in the polymer matrix minimizes back scatter by eliminating small aggregates, backward propagating emission still remains. To further curtail backward propagation within the one or more energy conversion layers, the multilayer structure of the luminous system of the present teachings may also optionally comprise a reflection layer, as illustrated in FIG. 6. The reflection layer 28 is disposed onto a surface of the one or more energy conversion layers 8 and redirects at least a portion of the secondary electromagnetic radiation towards the viewing hemisphere. As a result, the reflection layer 28 is also substantially transmissive of the primary electromagnetic radiation that the one or more illumination sources 2 output when powered. Furthermore, in certain applications, it is also advantageous for the one or more diffusion layers to be used in conjunction with a reflection layer, such that the backscattered electromagnetic radiation in the one or more diffusion layers are redirected toward the viewing hemisphere.

In general, the reflection layer may provide either diffuse reflection or specular reflection. In the instances where diffuse reflection is desired, a layer of material which scatters light without absorbing, such as titanium dioxide or barium sulfate, may be dispersed in a polymeric binder. In the instances where specular reflection is desired, a wavelength-selective specular reflection layer may be utilized so as not to disrupt the output of the primary electromagnetic radiation from the one or more illumination sources to that of the multilayer structure. Such a selective reflection layer can be made by alternately layering non-metallic materials with high and low dielectric constants with layer thicknesses of approximately ¼ the wavelength of the electromagnetic radiation to be reflected. The characteristics of the reflection layer are a function of the refractive index difference between the materials used in the low dielectric layers and those in the high dielectric layers, as well as the number of layers in the reflection layer structure. Typical refractive index differences fall in the range 0.05-1.0. Typical low dielectric materials have refractive indices at visible wavelengths in the range 1.35-1.50 and include materials such as, but not limited to, $MgF_2$, $CaF_2$, or fused silica. Typical high dielectric materials have refractive indices that range from 1.45-2.5 and include, but are not limited to, aluminum oxide, zirconium oxide, or titanium oxide. The high and low dielectric materials may also comprise optical polymers of suitable refractive index differences. Such dielectric stacks can be designed to pass a selective band of wavelengths, or they may be created as high- or low-pass filters. In instances where a dielectric reflection layer is disposed on a surface of the one or more energy conversion layers, such reflection layer may also serve the purpose of the one or more stability enhancement layers, since the metal oxide materials that typically comprise such dielectric reflection layers provide low diffusion of oxygen.

Figure 7:
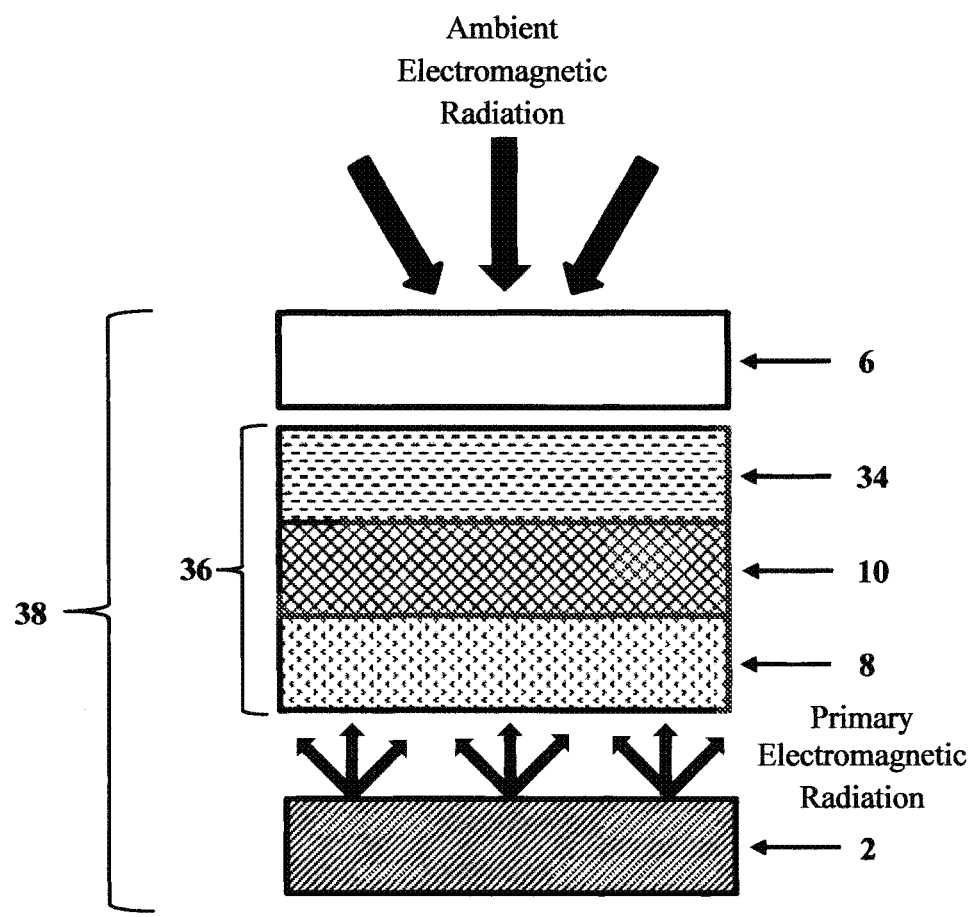
FIG. 7 is a schematic drawing of a luminous system according to yet another aspect of these teachings.

In a further aspect of the luminous system of the present teachings, the multilayer structure may also optionally comprise a protection layer that provides physical and chemical durability for the multilayer structure of the luminous system upon environmental exposure. In one aspect, as illustrated in FIG. 7, the protection layer 34 may be disposed onto a surface of the one or more diffusion layers 10. In another aspect, the protection layer may be disposed onto a surface of the one or more energy conversion layers. In instances where the multilayer structure also comprises one or more stability enhancement layers, it may be advantageous for the one or more stability enhancement layers to be used in conjunction with a protection layer disposed onto a surface of the one or more stability enhancement layers, since the material properties of common air barrier materials render the one or more stability enhancement layers sensitive to normal physical and chemical wear and degradation, and therefore the robustness of the multilayer structure of the luminous system can be improved with the addition of such protection layer to provide these properties.

Useful materials for the protection layer may include, but are not limited to, poly(methylmethacrylate), polycarbonate, or polyesters. Since many polymers can degrade upon exposure to ultraviolet (UV) radiation the protection layer may also contain absorbers of UV light that also protects the polymers and materials included within any of the one or more layers of the multilayer structure that may be located below the protection layer. Acceptable UV absorbers include, but are not limited to, hydroxybenzophenones, such as Chimmasorb® 81 from Ciba, hydroxyphenyl benzotriazoles, such as Tinuvin® 326 from Ciba, or hydroxyphenyl triazines, such as Tinuvin® 405 from Ciba.

Furthermore, a surface of the protection layer may also be modified to optimize light extraction from at least the multilayer structure. Such modifications may include, but are not limited to, antireflection layers or brightness enhancement structures, such as those and similar to those described in U.S. Pat. Nos. 4,542,449, 4,791,540, 4,799,131, 4,883,341, and 4,984,144, all of which are incorporated by reference herein in their entirety. In addition, the protection layer may also contain additional materials to enhance stability referred to earlier as photostabilizers such as antioxidants, HALS, singlet oxygen scavengers, etc.

The multilayer structure of the luminous system of the present teachings, as described above, may be formed by a number of methods well known in the art. For example, each layer may be prepared separately and then sequentially laminated or embossed together to form the multilayer structure. In another example, the integrated multilayer structure may be constructed by sequential coating of each layer, or by sequential lamination or embossing. Alternatively, several layers may be combined by sequential coating, lamination or embossing to form a substructure, and the required substructure then laminated or embossed together to form the multilayer structure. In a further example, each layer of the multilayer structure may be sequentially coated or sequentially laminated or embossed directly upon the one or more illumination sources to form the multilayer structure.

The luminous system of the present teachings, in addition to the one or more illumination sources and the multilayer structure, further comprises one or more diffuse reflection layers that are overlaid over a surface of the multilayer structure. The one or more diffuse reflection layers are optically decoupled from the multilayer structure, i.e. a medium having a substantially lower refractive index, e.g. air, exists between the one or more diffuse reflection layers and the multilayer structure, and redirect at least a portion of ambient electromagnetic radiation to the viewing hemisphere, so to substantially produce the reflection of the luminous system of the present teachings. In addition to the emission of the luminous system, the reflection of the luminous system is the other component of the observed visible color produced by the system. The reflection of the luminous system, where the one or more illumination sources are non-powered, primarily produces the second observed visible color as a result of the lack of primary electromagnetic radiation output from the one or more illumination sources. More specifically, by using the one or more diffuse reflection layers within the luminous system of the present teachings, the incident radiation upon the one or more energy conversion layers when non-powered, i.e. the transmitted ambient electromagnetic radiation to the one or more energy conversion layers, is minimized. In addition, the one or more diffuse reflection layers further reduces the energy of the secondary electromagnetic radiation that is transmitted to the viewing hemisphere by back reflecting a portion of such radiation. Also, since ambient electromagnetic radiation generally has a broad spectrum that is an observed visible color of white, if an observed visible color other than white is desired to be produced by the luminous system of the present teachings, light absorbers that will minimally, if at all, absorb the secondary electromagnetic radiation can be incorporated into the one or more diffuse reflection layers to provide the desired second observed visible color. Furthermore, in order for the emission of the luminous system to be observed, the one or more diffuse reflection layers minimally, if at all, absorb the unconverted incident radiation, as well as the secondary electromagnetic radiation emitted from the one or more energy conversion layers. It should be recognized that in certain applications it may be advantageous for the one or more diffuse reflection layers to be used in conjunction with a protection layer, so as to provide physical and chemical durability to the one or more diffuse reflection layers upon environmental exposure.

The portion of ambient electromagnetic radiation, if present, that is not redirected to the viewing hemisphere by that of the one or more diffusion reflection layers, in turn, transmits through and becomes a component of incident radiation upon the one or more energy conversion layers that is absorbed and converted to the secondary electromagnetic radiation emitted to the viewing hemisphere. As a result, the emission of the luminous system of the present teachings when the one or more illumination sources are non-powered is based on the amount of energy of ambient electromagnetic radiation that is incident upon the one or more energy conversion layers, however minimal. Thus, the secondary electromagnetic radiation converted from the transmitted ambient electromagnetic radiation should be considered when designing the luminous system to produce a desired second observed visible color.

Figure 8:
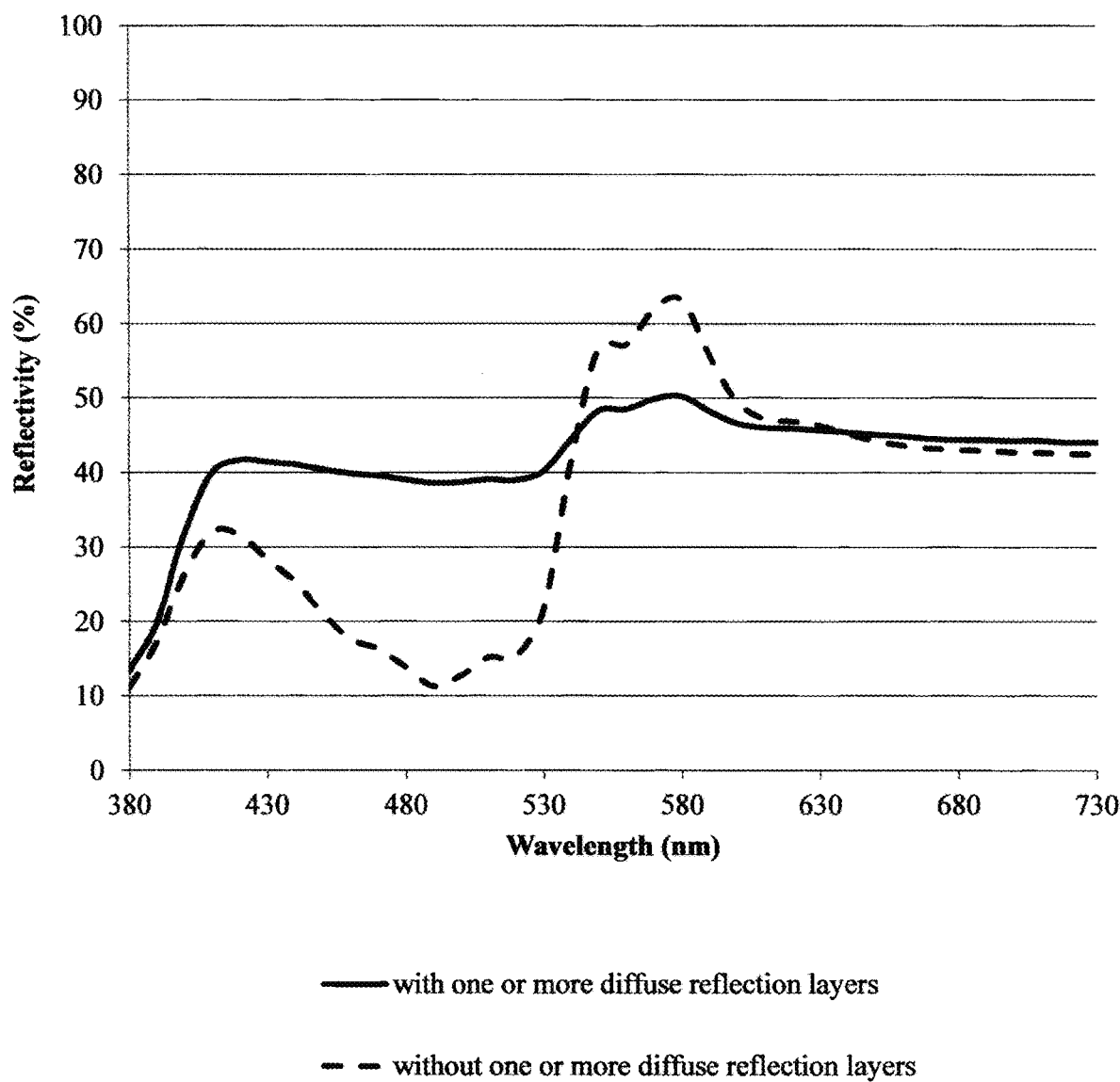
FIG. 8 is a graph comparing the reflection spectra of a non-powered luminous system according to one aspect of these teachings and a non-powered luminous system without the use of the one or more diffuse reflection layers.

FIG. 8 depicts the reflection spectra of an unpowered luminous system according to the present teachings, as well as the reflection spectra of an unpowered luminous system without the use of one or more diffuse reflection layers, both of which produce a first observed visible color of white. The second observed visible color produced results from the reflection of ambient electromagnetic radiation, as well as the emission from the one or more energy conversion layers of the multilayer structure as a result of excitation by transmitted ambient electromagnetic radiation. The luminous system without the one or more diffuse reflection layers produces a second observed visible color that is primarily the result of absorption and emission by that of the one or more energy conversion layers, whereas the luminous system with the one or more diffuse reflection layers produces a second observed visible color that is primary the result of reflection. The reason for this is that the presence of the one or more diffuse reflection layers attenuates the energy transmitted to the one or more energy conversion layers, thereby decreasing the amount of emission that is produced, thereby allowing for the reflected energy to overpower that of the emission to produce the second observed visible color.

Furthermore, given the nature of the one or more diffuse reflection layers, at least a portion of the unconverted incident radiation and secondary electromagnetic radiation may also be redirected back into the one or more energy conversion layers, thereby allowing for a greater amount of radiation to be absorbed and converted, thus producing a higher emission intensity of the secondary electromagnetic radiation of the luminous system than produced without the one or more diffuse reflection layers. As a result, the effects of such recirculation of radiation should be considered when designing the luminous system of the present teachings to produce a desired first observed color.

Figure 9:
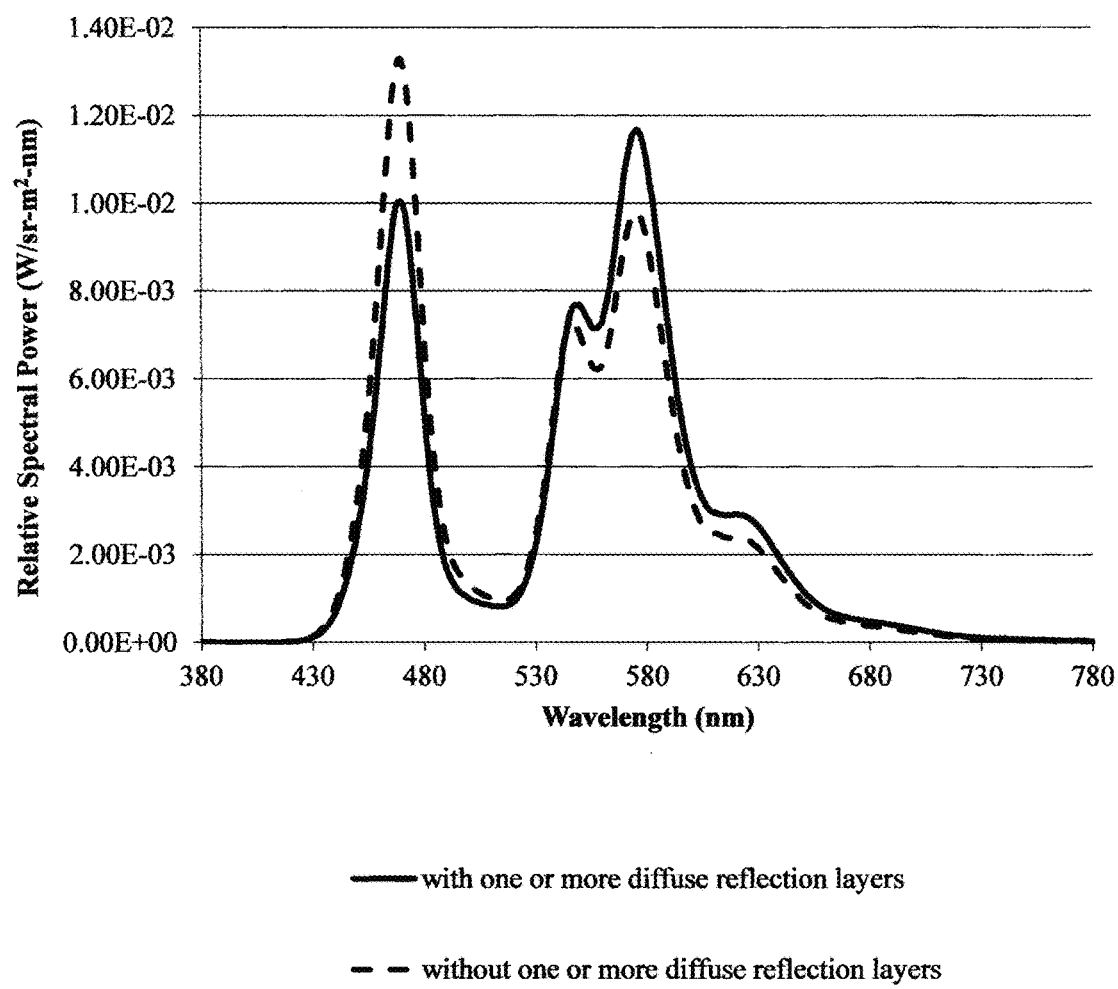
FIG. 9 is a graph comparing the emission spectra of a non-powered luminous system according to one aspect of these teachings and a non-powered luminous system without the use of the one or more diffuse reflection layers.

As an example, FIG. 9 depicts the emission spectra generated from a powered luminous system according to the present teachings, as well as the emission spectra generated from a powered luminous system without the use of one or more diffuse reflection layers. The spectrum of the primary electromagnetic radiation appears as a narrow spectral band from about 420-520 nm, peaking at about 470 nm. The spectrum of the secondary electromagnetic radiation appears as a broad band from about 490-720 nm with a principle maximum at 576 nm. As can be seen from FIG. 9, the use of the one or more diffuse reflection layers leads to an increase in emission intensity of the secondary electromagnetic radiation as a result of the amount of the unconverted incident radiation that is back reflected into the one or more energy conversion layers, thereby allowing for a greater amount of incident radiation to be absorbed and converted.

In some instances, the one or more diffuse reflection layers may comprise one or more light scattering materials separated into discrete domains that possess significantly different optical indices of refraction, which in most cases are due to the materials having different densities. In addition, the sizes of the domains have a significant effect on the efficiency of optical scattering, with larger domains providing more scattering. The one or more diffuse reflection layers can be produced in a variety of polymers, for example, acrylates, polyurethanes, polycarbonates, polyvinyl chlorides, silicone resins, or other common polymers. In particular, it is important that the polymer(s) of the one or more diffuse reflection layers do not substantially absorb, if at all, the incident radiation or the secondary electromagnetic radiation. Suitable light scattering materials that can be incorporated into the polymer of the one or more diffuse reflection layers include, but are not limited to, titanium dioxide, mica, or hollow or solid glass microspheres. Furthermore, small domains of incompatible polymers incorporated into the polymer of the one or more diffuse reflection layers may also serve as the one or more light scattering materials.

Once proper materials and concentrations have been identified, a variety of methods can be used to prepare the one or more diffuse reflection layers. Such methods include, for example, coating a layer, the layer being generally planar and prepared from a formulation with one or more light scattering materials and polymer substantially dispersed in a liquid carrier medium, onto a carrier substrate. Such coatings can be deposited for example, by painting, spraying, slot coating, dip coating, roller coating, bar coating, or printing methods, such as screen printing, screen gravure, screen flexographic, etc. Additional additives such as, but not limited to, dispersants, wetting agents, defoamers, leveling agents, or combinations thereof, may be added to the formulation used for coating such materials to aid in the dispersion of the one or more light scattering materials and the coating of the formulation itself. Such dispersants, wetting agents, defoamers, and leveling agents may each be oligomeric, polymeric, or copolymeric materials or blends containing surface-active (surfactant) characteristic blocks, such as, for example, polyethers, polyols, or polyacids. Alternatively, the one or more diffuse reflection layers may be prepared by methods that do not use a liquid carrier medium. For example, one or more light scattering materials and polymer can be converted to one or more diffuse reflection layers by extrusion, injection molding, compression molding, calendaring, or thermoforming. In the instances where more than one diffuse reflection layer is prepared, each diffusion layer can be sequentially coated, or the individual layers can be separately prepared and later laminated or embossed together.

In other instances, the one or more diffuse reflection layers may comprise a patterned plastic diffuser, i.e. an embossed structure in the surface of a plastic sheet that is designed to provide optical homogenization. Such patterned plastic diffusers are typically prepared by extrusion of a preformed sheet using a patterned die. Alternatively, a patterned plastic diffuser can be prepared by recording a holographic image of a diffuser in a holographic recording medium, thereby resulting in a holographic diffuser. A holographic diffuser may be recorded to produce a surface pattern, or may be recorded through the volume of the holographic recording medium. Such holographic diffusers are generally preferred given their low optical losses due to back scattering in contrast to conventional diffusers.

The luminous system of the present teachings, as described above, may be fabricated by a number of methods well known in the art. For example, providing the one or more illumination sources, applying the multilayer structure over at least a portion of at least one of the one or more exit regions of the one or more illumination sources, and overlaying the one or more diffuse reflection layers over a surface of the multilayer structure. The multilayer structure can be applied over at least a portion of at least one of the one or more exit regions of the one or more illumination sources in a number of ways, e.g. lamination, thermally or with adhesive. In some instances, the multilayer structure may be pre-formed prior to application. In other instances the multilayer structure may be built upon the one or more illumination sources, for example, the one or more energy conversion layers can be applied to the one or more illumination sources using a variety of coating methods, and the remaining layers then sequentially coated, or individually prepared and later laminated or embossed together, to form the multilayer structure. Furthermore, the multilayer structure may either be optically coupled or decoupled to the one or more illumination sources. The one or more diffuse reflection layers are rendered as discrete layer(s) that are optically decoupled from the multilayer structure.

EXEMPLIFICATIONS

The present teachings, having been generally described, will be more readily understood by reference to the following examples, which are included merely for the purposes of illustration of certain aspects and embodiments of the present teachings, and are not intended to limit the scope of these teachings.

Example 1. Preparation of Diffusion Layer
(Characterized as 10 in FIGS. 1, 2, and 5-7)

A formulation containing 0.9120 parts screen printing ink, such as Automark APL Dye-Based Clear, 0.00502 parts defoamer, such as Tego® Foamex N, 0.00201 parts of wetting agent, such as Tego® Wet 270, 0.00575 parts titanium dioxide, 0.000182 parts dispersant, such as DisperBYK® 112, and 0.0751 parts spherical glass beads, such as Sphericel® 110P8, was prepared and stirred at room temperature. The formulation was screen printed onto 10 mil carrier substrate, such as a clear polyester substrate (Mylar), through a 60 mesh steel screen and dried at 80° C. for 30 minutes to yield a 2.3 mil or 58 micron thick, diffusion layer.

Example 2. Preparation of Energy Conversion
Layer (Characterized as 8 in FIGS. 1, 2, and 5-7)
and Preparation of Multilayer Structure
(Characterized as 4 in FIGS. 1 and 2)

A formulation containing 0.9535 parts screen printing ink, such as Automark APL Dye-Based Clear, 0.00449 parts defoamer, such as Tego® Foamex N, 0.00220 parts of wetting agent, such as Tego® Wet 270, and 0.000195 parts 3-cyanoperylene-9,10-dicarboxylic acid 2',6'-diisopropylanilide in 0.0389 parts dioxolane, and 0.00045 parts 3,4,9,10-perylene tetracarboxylic acid bis(2',6'-diisopropyl)anilide was prepared and stirred at room temperature. The formulation was printed onto the diffusion layer prepared in Example 1 through a 60 mesh steel screen and dried at 80° C. for 60 minutes to yield a 1 mil or 25 micron thick, yellow daylight color energy conversion layer coupled to the diffusion layer, thereby resulting in a multilayer structure.

Example 3. Preparation of Diffuse Reflection Layer
(Characterized as 6 in FIGS. 1, 2, and 5-7)

A formulation containing 0.9747 parts screen printing ink, such as Automark APL Dye-Based Clear, 0.00509 parts defoamer, such as Tego® Foamex N, 0.00201 parts of wetting agent, such as Tego® Wet 270, 0.0166 parts titanium dioxide, and 0.00166 parts dispersant, such as DisperBYK® 112 was prepared and stirred at room temperature. The formulation was screen printed onto 10 mil carrier substrate, such as a clear polyester substrate (Mylar), through a 60 mesh steel screen and dried at 80° C. for 30 minutes to yield a diffusion reflection layer.

Example 4. Preparation of Luminous System
(Characterized as 20 in FIG. 2)

Illumination Source: A light guide was prepared from 125 mil (⅛") thick clear acrylic sheet cut to approximately 12"×¾". Roughing regions approximately ½" long sequentially along the acrylic strip of the bottom surface of the light guide was formed using laser etching. A light emitting element, such as a blue light emitting diode operating at approximately 470 nm (peak wavelength), was abutted to one edge of the light guide.
Multilayer Structure:
Prepared as in Example 2.

Diffuse Reflection Layer:

Prepared as in Example 3.

The multilayer structure was placed over at least a portion of the top surface of the light guide, such that the energy conversion layer component of the multilayer structure is nearest the top surface of the light guide. The diffuse reflection layer was placed over the multilayer structure, such that the surface of the carrier substrate of the diffuse reflection layer is the top-most surface to the viewing hemisphere, yielding a luminous system comprising an illumination source, a multilayer structure, and a diffuse reflection layer.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various embodiments, it should be realized that these teachings are also capable of a wide variety of further and other embodiments within the spirit and scope of the appended disclosure.

What is claim is:

1. A luminous system, said luminous system comprising:
   one or more illumination sources that output, when powered, a primary electromagnetic radiation through one or more exit regions;
   a multilayer structure, said multilayer structure comprising:
   (i) one or more energy conversion layers that convert at least a portion of incident radiation to a secondary electromagnetic radiation that is at least partially emitted to a viewing hemisphere, the incident radiation being at least one of said primary electromagnetic radiation or ambient electromagnetic radiation, and
   (ii) one or more diffusion layers that substantially increase optical scattering of at least a portion of radiation, the radiation being at least one of said primary electromagnetic radiation, said secondary electromagnetic radiation, or ambient electromagnetic radiation; and
   one or more diffuse reflection layers that redirect at least a portion of ambient electromagnetic radiation to the viewing hemisphere, said one or more diffuse reflection layers being optically decoupled from said multilayer structure,
   wherein an amount of redirected ambient electromagnetic radiation is greater than an amount of ambient electromagnetic radiation converted by the one or more energy conversion layers, and
   the emission and the reflection of said luminous system produce a first observed visible color when said one or more illumination sources are powered and a second observed visible color when said one or more illumination sources are non-powered.

2. The luminous system of claim 1, wherein said first observed visible color and said second observed visible color are substantially similar.

3. The luminous system of claim 1, wherein said one or more illumination sources comprise one or more light emitting elements.

4. The luminous system of claim 3, wherein said one or more illumination sources further comprise one or more optical elements that receive and propagate at least a portion of said primary electromagnetic radiation emitted from said one or more light emitting elements and substantially transmit said primary electromagnetic radiation through said one or more exit regions to said multilayer structure.

5. The luminous system of claim 4, wherein said one or more optical elements comprise one or more light guides having a surface with one or more extraction regions.

6. The luminous system of claim 5, wherein said one or more extraction regions of the surface of said one or more light guides are remote to said one or more light emitting elements.

7. The luminous system of claim 1, wherein said one or more illumination sources further comprise a reflection layer that redirects at least a portion of said primary electromagnetic radiation to the viewing hemisphere.

8. The luminous system of claim 1, wherein said multilayer structure is optically coupled to said one or more illumination sources.

9. The luminous system of claim 1, wherein said multilayer structure is optically decoupled from said one or more illumination sources.

10. The luminous system of claim 1, wherein said one or more diffusion layers additionally fulfill the function of a protection layer that provides physical and chemical durability for said multilayer structure.

11. The luminous system of claim 1, wherein said one or more energy conversion layers further comprise one or more light scattering materials that disperse at least a portion of radiation, the radiation being at least one of said primary electromagnetic radiation or said secondary electromagnetic radiation.

12. The luminous system of claim 1, wherein said multilayer structure further comprises a reflection layer that redirects at least a portion of said, secondary electromagnetic radiation to the viewing hemisphere, said reflection layer being substantially transmissive of said primary electromagnetic radiation.

13. The luminous system of claim 1, wherein said multilayer structure further comprises one or more stability enhancement layers that increase photolytic and thermal stability of said multilayer structure.

14. The luminous system of claim 1, wherein said multi layer structure further comprises a protection layer that provides physical and chemical durability for said multilayer structure.

15. A method for fabricating a luminous system, said method comprising:
   providing one or more illumination sources that output, when powered, a primary electromagnetic radiation through one or more exit regions;
   applying a multilayer structure over at least a portion of at least one of said cone or more exit regions, said multilayer structure comprising:
   (i) one or more energy conversion layers that convert at least a portion of incident radiation to a secondary electromagnetic radiation that is at least partially emitted to a viewing, hemisphere, the incident radiation being at least one of said primary electromagnetic radiation or ambient electromagnetic radiation, and
   (ii) one or more diffusion layers disposed over a surface of said one or more energy conversion layers to substantially increase optical scattering of at least a portion of radiation, the radiation being at least one of said primary electromagnetic radiation, said secondary electromagnetic radiation, or ambient electromagnetic radiation; and overlaying one or more diffuse reflection layers over a surface of said multilayer structure to reflect at least a portion of ambient electromagnetic radiation to the viewing hemisphere, wherein said one or more diffuse reflection layers being optically decoupled from said multilayer structure, wherein an amount of redirected ambient electromagnetic radiation is greater than an amount of ambient electromagnetic radiation converted by the one or more energy conversion layers, and wherein the emission and the reflection of said luminous system produce a first observed visible color when said one or more illumination sources are powered and a second observed visible color when said one or more illumination sources are non-powered.

16. The method of claim 15, wherein said first observed visible color and said second observed visible color are substantially similar.

17. The method of claim 15, wherein said multilayer structure is optically coupled to said one or more illumination sources.

18. The method of claim 15, wherein said multilayer structure is optically decoupled from said one or more illumination sources.

19. The method of claim 15, wherein said one or more illumination sources comprise one or more light emitting elements.

20. The method of claim 19, wherein said one or more illumination sources further comprise a reflection layer disposed onto a surface of said one or more light emitting elements to redirect at least a portion of said primary electromagnetic radiation to the viewing hemisphere.

21. The method of claim 19, wherein said one or more illumination sources further comprise one or more optical elements that receive and propagate at least a portion of said primary electromagnetic radiation emitted from said one or more light emitting elements and substantially transmit said primary electromagnetic radiation through said one or more exit regions to said multilayer structure.

22. The method of claim 21, wherein said one or more optical elements comprise one or more light guides having a surface with one or more extraction regions.

23. The method of claim 21, wherein said one or more illumination sources comprise a reflection layer disposed onto a surface of said one or more optical elements to redirect at least a portion of said primary electromagnetic radiation to the viewing hemisphere.

24. The method of claim 15, wherein said one or more energy conversion layers further comprise one or more light scattering materials that disperse at least a portion of radiation, the radiation being at least one of said primary electromagnetic radiation or said secondary electromagnetic radiation.

25. The method of claim 15, wherein said multilayer structure further comprises a reflection layer disposed onto a surface of said one or more energy conversion layers to redirect at least a portion of said secondary electromagnetic radiation to the viewing hemisphere, said reflection layer being substantially transmissive of said primary electromagnetic radiation.

26. The method of claim 15, wherein said multilayer structure further comprises one or more stability enhancement layers disposed onto at least a surface of said one or more energy conversion layers to increase photolytic and thermal stability of said multilayer structure.

27. The method of claim 15, wherein said multilayer structure further comprises a protection layer disposed onto a surface of said one or more energy conversion layers to provide physical and chemical durability for said multilayer structure.

28. The method of claim 15, wherein said multilayer structure further comprises a protection layer disposed onto a surface of said one or more diffusion layers to provide physical and chemical durability for said multilayer structure.

* * * * *